US010657521B2

(12) United States Patent
Tomasofsky et al.

(10) Patent No.: US 10,657,521 B2
(45) Date of Patent: May 19, 2020

(54) SYSTEMS AND METHODS FOR DETERMINING FRAUDULENT TRANSACTIONS USING DIGITAL WALLET DATA

(71) Applicant: MasterCard International Incorporated, Purchase, NY (US)

(72) Inventors: Christian P. Tomasofsky, San Francisco, CA (US); Steve E. Hubbard, Leicester (GB); Luis Felipe de Almeida Ferreira da Silva, Brussels (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 528 days.

(21) Appl. No.: 14/719,645

(22) Filed: May 22, 2015

(65) Prior Publication Data
US 2016/0078443 A1 Mar. 17, 2016

Related U.S. Application Data

(60) Provisional application No. 62/051,150, filed on Sep. 16, 2014.

(51) Int. Cl.
*G06Q 20/00* (2012.01)
*G06Q 20/36* (2012.01)
(Continued)

(52) U.S. Cl.
CPC .......... *G06Q 20/36* (2013.01); *G06Q 20/363* (2013.01); *G06Q 20/3674* (2013.01);
(Continued)

(58) Field of Classification Search
CPC .............. G06Q 20/00; G06Q 20/40
(Continued)

(56) References Cited

U.S. PATENT DOCUMENTS

| 4,734,564 A | 3/1988 | Boston et al. |
| 4,812,628 A | 3/1989 | Boston et al. |

(Continued)

FOREIGN PATENT DOCUMENTS

| WO | 2012166790 | 12/2012 |
| WO | 2013082190 | 6/2013 |

(Continued)

OTHER PUBLICATIONS

Wirecard 3-D secure (white paper). (Year: 2007).*
(Continued)

*Primary Examiner* — Bruce I Ebersman
(74) *Attorney, Agent, or Firm* — Armstrong Teasdale LLP

(57) ABSTRACT

A computing device for risk-based analysis of a payment card transaction is provided herein. The computing device includes a processor communicatively coupled to a memory. The computing device is programmed to receive a request for authentication of the payment card transaction. The payment card transaction includes a suspect consumer presenting a payment card from a digital wallet of a privileged cardholder. The computing device is also programmed to identify fraud feature data from the digital wallet. The computing device is further programmed to compute a fraud score for the payment card transaction based at least in part on the fraud feature data. The computing device is still further programmed to provide the fraud score for use during authentication of the suspect consumer.

15 Claims, 14 Drawing Sheets

(51) Int. Cl.
*G06Q 20/40* (2012.01)
*G06Q 30/02* (2012.01)

(52) U.S. Cl.
CPC ......... *G06Q 20/405* (2013.01); *G06Q 20/409* (2013.01); *G06Q 20/4014* (2013.01); *G06Q 20/4016* (2013.01); *G06Q 30/0229* (2013.01)

(58) Field of Classification Search
USPC .................................................. 705/35–45
See application file for complete search history.

(56) References Cited

U.S. PATENT DOCUMENTS

| | | | |
|---|---|---|---|
| 5,177,342 A | 1/1993 | Adams | |
| 5,732,397 A | 3/1998 | DeTore et al. | |
| 6,029,154 A | 2/2000 | Pettitt | |
| 6,119,103 A | 9/2000 | Basch et al. | |
| 6,330,546 B1 | 12/2001 | Gopinathan et al. | |
| 6,658,393 B1 | 12/2003 | Basch et al. | |
| 7,096,192 B1 | 8/2006 | Pettitt | |
| 7,251,624 B1 | 7/2007 | Lee et al. | |
| 7,263,506 B2 | 8/2007 | Lee et al. | |
| 7,403,922 B1 | 7/2008 | Lewis et al. | |
| 7,668,769 B2 | 2/2010 | Baker et al. | |
| 7,813,822 B1* | 10/2010 | Hoffberg | G06K 9/00369 381/73.1 |
| 7,970,701 B2 | 6/2011 | Lewis et al. | |
| 8,020,763 B1* | 9/2011 | Kowalchyk | G06Q 20/102 235/380 |
| 8,090,648 B2 | 1/2012 | Zoldi et al. | |
| 8,140,415 B2 | 3/2012 | Lawrence | |
| 8,209,246 B2 | 6/2012 | Lawrence | |
| 8,244,629 B2 | 8/2012 | Lewis et al. | |
| 8,301,000 B2 | 10/2012 | Sillard et al. | |
| 8,301,090 B2 | 11/2012 | Wiesman et al. | |
| 8,316,237 B1* | 11/2012 | Felsher | H04L 9/0825 380/282 |
| 8,626,663 B2 | 1/2014 | Nightengale et al. | |
| 8,700,729 B2 | 4/2014 | Dua | |
| 8,788,396 B2 | 7/2014 | Cole et al. | |
| 10,304,056 B1* | 5/2019 | Izenson | G06Q 20/322 |
| 2002/0194138 A1 | 12/2002 | Dominguez et al. | |
| 2003/0126094 A1 | 7/2003 | Fisher et al. | |
| 2003/0200184 A1 | 10/2003 | Dominguez et al. | |
| 2004/0225473 A1* | 11/2004 | Aoki | G06Q 20/40 702/181 |
| 2005/0086090 A1 | 4/2005 | Abrahams et al. | |
| 2005/0097320 A1 | 5/2005 | Golan | |
| 2005/0149455 A1 | 7/2005 | Bruesewitz et al. | |
| 2006/0162060 A1 | 7/2006 | Coleman et al. | |
| 2006/0165060 A1 | 7/2006 | Dua | |
| 2007/0125840 A1 | 6/2007 | Law et al. | |
| 2008/0140576 A1* | 6/2008 | Lewis | G06Q 10/0635 705/67 |
| 2008/0275748 A1* | 11/2008 | John | G06Q 30/06 705/35 |
| 2009/0106160 A1 | 4/2009 | Skowronek | |
| 2009/0288012 A1 | 11/2009 | Hertel et al. | |
| 2010/0114776 A1 | 5/2010 | Weller et al. | |
| 2010/0145836 A1 | 6/2010 | Bake et al. | |
| 2010/0243728 A1 | 9/2010 | Wiesman et al. | |
| 2010/0268648 A1 | 10/2010 | Wiesman et al. | |
| 2011/0004498 A1 | 1/2011 | Readshaw | |
| 2011/0055074 A1* | 3/2011 | Chen | G06Q 20/10 705/39 |
| 2011/0238575 A1* | 9/2011 | Nightengale | G06Q 20/20 705/44 |
| 2012/0011063 A1 | 1/2012 | Killian et al. | |
| 2012/0030083 A1* | 2/2012 | Newman | G06Q 40/00 705/35 |
| 2012/0130853 A1 | 5/2012 | Petri et al. | |
| 2012/0143752 A1 | 6/2012 | Wong et al. | |
| 2012/0166790 A1 | 6/2012 | Kitase et al. | |
| 2012/0197802 A1* | 8/2012 | Smith | G06Q 20/12 705/44 |
| 2012/0203679 A1 | 8/2012 | Ericson et al. | |
| 2012/0278246 A1* | 11/2012 | Boding | G06Q 40/02 705/317 |
| 2012/0290482 A1 | 11/2012 | Atef et al. | |
| 2012/0316961 A1 | 12/2012 | Evans et al. | |
| 2013/0018795 A1* | 1/2013 | Kolhatkar | G06Q 20/4016 705/44 |
| 2013/0024289 A1 | 1/2013 | Cueli et al. | |
| 2013/0024364 A1 | 1/2013 | Shrivastava et al. | |
| 2013/0024371 A1 | 1/2013 | Hariramani et al. | |
| 2013/0060600 A1 | 3/2013 | Schoolman | |
| 2013/0073458 A1 | 3/2013 | Sherwin | |
| 2013/0073463 A1 | 3/2013 | Dimmick et al. | |
| 2013/0082190 A1 | 4/2013 | Momoi et al. | |
| 2013/0110658 A1 | 5/2013 | Lyman et al. | |
| 2013/0144785 A1 | 6/2013 | Karpenko et al. | |
| 2013/0197998 A1 | 8/2013 | Buhrmann et al. | |
| 2013/0218765 A1* | 8/2013 | Hammad | G06Q 20/4016 705/41 |
| 2013/0339249 A1 | 12/2013 | Weller et al. | |
| 2013/0346287 A1 | 12/2013 | Enzaldo et al. | |
| 2013/0346314 A1* | 12/2013 | Mogollon | G06Q 20/12 705/44 |
| 2014/0007179 A1 | 1/2014 | Moore | |
| 2014/0019352 A1 | 1/2014 | Shrivastava | |
| 2014/0040139 A1 | 2/2014 | Brudnicki et al. | |
| 2014/0058949 A1 | 2/2014 | Ciurea | |
| 2014/0095393 A1 | 4/2014 | Nightengale et al. | |
| 2014/0114857 A1 | 4/2014 | Griggs et al. | |
| 2014/0164254 A1 | 6/2014 | Dimmick | |
| 2014/0172724 A1 | 6/2014 | Dua | |
| 2014/0195425 A1* | 7/2014 | Campos | G06Q 20/20 705/41 |
| 2014/0222682 A1 | 8/2014 | Dua | |
| 2014/0250006 A1* | 9/2014 | Makhotin | G06Q 20/3227 705/41 |
| 2014/0279474 A1 | 9/2014 | Evans et al. | |
| 2014/0279477 A1* | 9/2014 | Sheets | G06Q 40/02 705/41 |
| 2014/0344155 A1* | 11/2014 | Liu | G06Q 20/4016 705/44 |
| 2015/0012430 A1 | 1/2015 | Chisholm et al. | |
| 2015/0046339 A1* | 2/2015 | Wong | G06Q 20/382 705/71 |
| 2015/0088750 A1 | 3/2015 | Dua | |
| 2015/0095174 A1 | 4/2015 | Dua | |
| 2015/0120472 A1* | 4/2015 | Aabye | G06Q 20/36 705/16 |
| 2015/0220914 A1 | 8/2015 | Purves et al. | |
| 2015/0235221 A1 | 8/2015 | Murphy et al. | |
| 2015/0254645 A1* | 9/2015 | Bondesen | G06Q 20/363 705/41 |
| 2015/0254699 A1* | 9/2015 | Bondesen | G06Q 30/0215 705/14.17 |
| 2015/0348042 A1 | 12/2015 | Jivraj et al. | |
| 2016/0005029 A1 | 1/2016 | Ivey et al. | |
| 2016/0034900 A1 | 2/2016 | Nelsen et al. | |
| 2016/0042344 A1* | 2/2016 | Thimmana | G06Q 20/3672 705/41 |
| 2016/0078444 A1 | 3/2016 | Tomasofsky et al. | |
| 2016/0140558 A1 | 5/2016 | Groarke et al. | |
| 2016/0140561 A1* | 5/2016 | Cowan | G06Q 20/4016 705/26.35 |

FOREIGN PATENT DOCUMENTS

| | | |
|---|---|---|
| WO | 2014013342 | 1/2014 |
| WO | 2014080353 | 5/2014 |

OTHER PUBLICATIONS

"Introducing 3-D Secure", Wirecard White Paper Version 1.1.0, Jul. 2007.

(56) References Cited

OTHER PUBLICATIONS

International Search Report and Written Opinion for International Application No. PCT/US2015/050222, dated Dec. 28, 2015, 10 pages.
European Supplementary Search Report for EP 15 84 1314, dated Jan. 23, 2018, 8 pages.
International Search Report and Written Opinion for International Application No. PCT/US2015/050237, dated Jan. 8, 2016, 10 pages.
European Supplementary Search Report for EP 15 84 1733, dated Jan. 23, 2018, 9 pages.
International Search Report and Written Opinion for International Application No. PCT/2015/050248, dated Jan. 8, 2016, 12 pages.
European Supplementary Search Report for EP 15 84 2105, dated Jan. 23, 2018, 9 pages.

* cited by examiner

SYSTEMS AND METHODS FOR DETERMINING FRAUDULENT TRANSACTIONS USING DIGITAL WALLET DATA

CROSS-REFERENCE TO RELATED APPLICATIONS

This application claims priority to U.S. Provisional Patent Application Ser. No. 62/051,150, filed Sep. 16, 2014, which is incorporated herein by reference in its entirety.

BACKGROUND OF THE DISCLOSURE

This invention relates generally to risk and fraud associated with payment card transactions and, more particularly, to network-based systems and methods for providing risk analysis and decision-making services for a merchant while processing payment card transactions.

At least some known credit/debit card purchases involve fraudulent activity. These fraudulent transactions present liability issues to one or more parties involved in the transaction, such as an issuing bank, a merchant, a payment processing network, or an acquirer bank. As such, these parties are interested in fraud detection, or the ability to analyze the data surrounding a payment card transaction before authorizing the transaction. Accordingly, a technical solution is desirable that provides a risk-based evaluation and a decisioning service to one or more of the parties during a payment card transaction.

BRIEF DESCRIPTION OF THE DISCLOSURE

In one aspect, a computing device for risk-based analysis of a payment card transaction is provided. The computing device includes a processor communicatively coupled to a memory. The computing device is programmed to receive a request for authentication of the payment card transaction. The payment card transaction includes a suspect consumer presenting a payment card from a digital wallet of a privileged cardholder. The computing device is also programmed to identify fraud feature data from the digital wallet. The computing device is further programmed to compute a fraud score for the payment card transaction based at least in part on the fraud feature data. The computing device is still further programmed to provide the fraud score for use during authentication of the suspect consumer.

In another aspect, a computer-based method for risk-based analysis of a payment card transaction is provided. The method is implemented using a computer device including a processor and a memory. The method includes receiving a request for authentication of the payment card transaction. The payment card transaction includes a suspect consumer presenting a payment card from a digital wallet of a privileged cardholder. The method further includes identifying fraud feature data from the digital wallet. The method also includes computing a fraud score for the payment card transaction based at least in part on the fraud feature data. The method still further includes providing the fraud score for use during authentication of the suspect consumer.

In yet another aspect, at least one non-transitory computer-readable storage media having computer-executable instructions embodied thereon is provided. When executed by at least one processor, the computer-executable instructions cause the processor to receive a request for authentication of a payment card transaction. The payment card transaction includes a suspect consumer presenting a payment card from a digital wallet of a privileged cardholder. The computer-executable instructions further cause the processor to identify fraud feature data from the digital wallet. The computer-executable instructions also cause the processor to compute a fraud score for the payment card transaction based at least in part on the fraud feature data. The computer-executable instructions still further cause the processor to provide the fraud score for use during authentication of the suspect consumer.

BRIEF DESCRIPTION OF THE DRAWINGS

FIG. 1 is a schematic diagram illustrating an example multi-party transaction card industry system for authorizing payment card transactions and, more specifically, for providing fraud scoring services for card-not-present transactions during user authentication and/or payment authorization of a payment-by-card transaction (e.g., online transactions involving a digital wallet).

FIG. 2 is a simplified block diagram of an example transaction processing system (TPS) for providing risk-based decisioning services using a risk-based decisioning (RBD) system to merchants and/or merchant acquirers in payment network.

FIG. 3 is an expanded block diagram of an example embodiment of a server architecture of a transaction processing network including a TPS, an RBD system, and an authentication service, that may be used to perform various authentication services for a payment card transaction.

FIG. 4 illustrates an example configuration of a user system operated by a user such as the cardholder shown in FIG. 1.

FIG. 5 illustrates an example configuration of a server system such as the server system shown in FIGS. 2 and 3.

FIG. 6 is a diagram of an example digital wallet of a cardholder.

FIG. 7 is a data flow diagram of an example risk-based decisioning (RBD) module which generates a risk result ("risk score") for a transaction involving a digital wallet such as digital wallet.

FIG. 8 is a process diagram of an example process for computing risk result for a digital-wallet based payment card transaction such as the transaction shown in FIG. 7.

FIG. 9 is a diagram of an example payment network in which a transaction processing system (TPS) facilitates risk-based decisioning of a card-not-present (CNP) payment card transaction (the "suspect transaction" or "subject transaction") between a suspect consumer and a merchant.

FIG. 10 is swimlane diagram illustrating an exemplary portion of an authentication request process that includes providing authentication data to an issuer during transaction authentication.

FIG. 11 is an example method for risk-based analysis of a payment card transaction using, for example, the risk-based decisioning (RBD) system shown in FIGS. 7-9 in the example environment shown in FIG. 1.

FIG. 12 is an example method for providing risk-based decisioning to a merchant during payment card transactions in the example environment shown in FIG. 1.

FIG. 13 is an example method for providing fraud data within an authentication system including an authentication protocol.

FIG. 14 shows an example configuration of a database within a computing device, along with other related computing components, that may be used to analyze of a payment card transaction for risk, to provide risk-based decisioning to a merchant during payment card transactions, and/or to provide fraud data within an authentication system including an authentication protocol.

Like numbers in the Figures indicate the same or functionally similar components.

DETAILED DESCRIPTION OF THE DISCLOSURE

Figure 1:
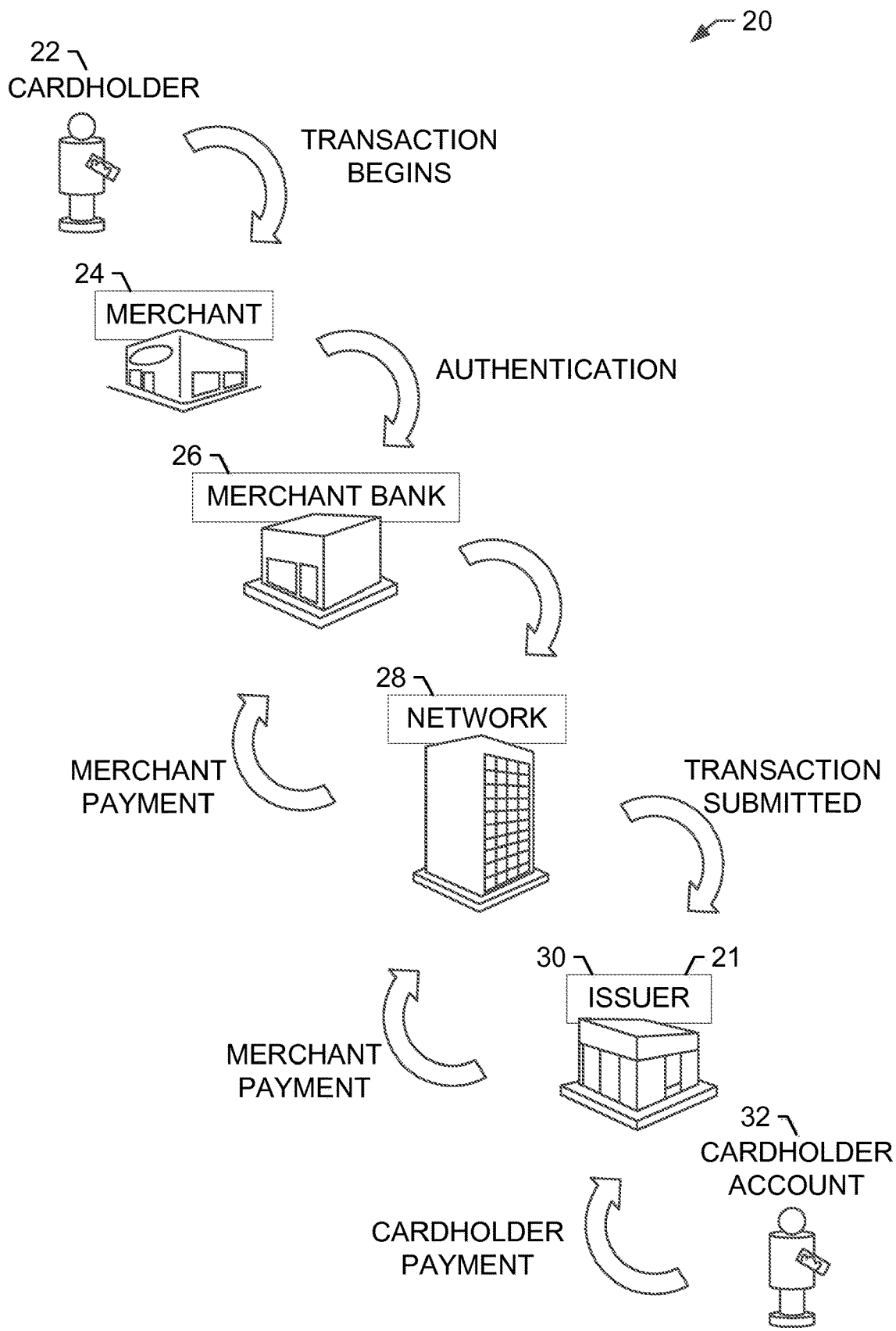
FIGS. 1-14 show example embodiments of the methods and systems described herein.

Systems and methods are described herein for evaluating payment card transactions for fraud. In one aspect, systems and methods are provided for performing risk-based decisioning for payment card transactions involving a digital wallet and associated data. In another aspect, systems and methods are provided for providing risk-based decisioning to merchants and/or merchant acquirers. In still another aspect, systems and methods are provided for sharing risk-based decisioning data with an issuer through use of extensions to an authentication protocol.

Risk-based decisioning for payment card transactions involves evaluating data included within a prior authorization message of a payment card transaction. At least some known credit/debit card purchases involve the exchange of a number of payment card network messages between the merchant, acquirer, and issuer parties of a four-party interchange model. Such messages may include authorizations, advices, reversals, account status inquiry presentments, purchase returns, and chargebacks. The credit or debit card payment transaction messages may include several transaction attributes, such as, for example, primary account number (either real or virtual), transaction amount, merchant identifier, acquirer identifier (the combination of which with above uniquely identifies a merchant), transaction date-time, and address verification.

In some situations such as in-store credit card purchases, the issuer of the credit card typically assumes liability for certain aspects of the transaction, such as chargebacks. In other situations, such as online transactions through a merchant web site, the merchant party in the transaction assumes initial liability for certain aspects of the transaction unless, for example, certain risk-mitigating steps are taken, such as an authentication step. For example, some known payment networks engage an authentication service such as a 3-D Secure® (Visa International Service Association, Delaware) (3DS) protocol (e.g., MasterCard SecureCode® (MasterCard International Incorporated, Purchase, N.Y.)) that performs an authentication of a suspect consumer prior to authorization of the transaction. During some known 3-D Secure transactions, the suspect consumer (i.e., the consumer attempting to perform the payment card transaction with the merchant) is presented with an authentication challenge, sometimes called a "step-up challenge." This step-up challenge generally requires the suspect consumer to provide a password, or a passcode from a second factor user device, before the transaction will be processed. This extra step presents an interruptive inconvenience, barrier, or an interference to at least some legitimate consumers, and subsequently causes at least some consumers to abandon legitimate transactions. These abandonments results in lost revenues to both the merchant and the issuer.

One risk-based decisioning (RBD) system described herein evaluates payment card transactions involving digital wallets. During a payment card transaction, such as an online transaction on a merchant web site, the suspect consumer uses a computing device such as a smart phone or personal computer device to login to a digital wallet. The suspect consumer selects a payment card from the digital wallet for use in the transaction, and the merchant or digital wallet provider initiates an authentication process (i.e., to gauge whether or not the suspect consumer is a privileged cardholder associated with the payment card).

The RBD system identifies one or more pieces of information about the payment card transaction that are used to "score" the transaction for risk (e.g., potential fraud). More specifically, the RBD system scores the payment card transaction based on three aspects: device information, payment card information, and digital wallet information. Device information may include information about the computing device used during the transaction, such as a unique hardware identifier, or an IP address associated with the device. Payment card information may include information about the payment card or the privileged cardholder, such as an expiration date of the payment card or a name or a home address of the privileged cardholder. Digital wallet information may include information about the digital wallet used during the transaction, such as how the suspect consumer was authenticated into the digital wallet, whether the digital wallet has historically been used with the current computing device, or whether the shipping address of the current transaction is a shipping address previously used with the digital wallet.

In one embodiment, the RBD system generates a device score from the device information and a digital wallet score from the digital wallet information and combines these scores into a session trust level. The session trust level generally indicates a confidence as to whether or not the user of the device and wallet is the privileged cardholder. This level may be a level such as, for example, one of "basic", "good", "excellent", and "trusted." The RBD system also generates a payment card score from the payment card information and combines the payment card score with the session trust level to generate an overall transaction risk level for the payment card transaction. From this overall transaction risk level, the RBD system generates a baseline recommendation.

In some embodiments, parties to the transaction (e.g., issuers) may provide to the RBD system certain transaction limits, such as a transaction amount limit for individual payment cards, a daily spend limit, or a number of transactions limit. Further, these limits may be customized based at least in part on the overall transaction risk level. For example, transactions that the RBD system scores as less risky (e.g., "excellent" or "trusted" overall risk level) may have higher thresholds (e.g., higher transaction amount limit) than transactions that the RBD system scores as more risky.

In some embodiments, the RBD system may be provided as a service to issuing banks. In other words, the RBD system may provide scores to an issuer's access control system (ACS), and the ACS may make decisions based at least in part on the risk scores or risk data available from the RBD system.

In another aspect described herein, the RBD system sends risk-based decisioning data to the issuer's ACS via an extension message to the 3DS protocol.

For example, the RBD system may score the payment card transaction and provide an overall score and/or an overall recommendation to the issuer's ACS by embedding an XML-formatted message as a 3DS extension during the authentication process. The RBD system may send other "sub-scores" within the 3DS extension message, such as the device score, the digital wallet score, or the payment card score. In some embodiments, the RBD system may share individual risk-based data elements such as the method the suspect consumer authenticated into the digital wallet, or how long the digital wallet has been in service. Using this risk-based data, the issuer's ACS determines whether or not the suspect consumer should be further authenticated (e.g., through a 3DS "step-up" challenge).

In yet another aspect described herein, the RBD system is presented for use by a merchant, a merchant acquirer, and/or a merchant service provider in card-not-present (CNP) transactions, such as online transactions. One risk-mitigating step for some issuers and large merchants is to perform their own risk-based decisioning on the transaction prior to authorization, such as described above. These parties may establish a custom fraud analysis system to analyze transactions for fraud. However, these systems can be resource-intensive and, as such, not feasible for smaller entities, such as small- or medium-sized merchants.

In an example embodiment, a transaction processing system (TPS) provides merchants and/or acquiring banks an option to perform risk-based decisioning on payment card transactions prior to the normal authorization process. For certain types of transactions, merchants may retain liability for the transaction. As such, merchants may desire additional risk mitigation by analyzing transactions for potential fraud prior to accepting liability. In one embodiment, an acquiring bank may offer or provide this risk-based decisioning process to one or more of their associated merchants, and thus may engage the TPS of the payment network to perform this process for those merchant transactions. In other words, the payment network provides this service on behalf of the acquiring banks to the merchants. In another embodiment, merchants may directly engage the payment network to perform this process on behalf of the merchant. In yet another embodiment, a third-party processing service performs this process on behalf of the merchant.

One TPS described herein engages an RBD system on behalf of the merchant, or the acquiring bank, during a payment card transaction. More specifically, at the time a transaction is initiated, the TPS receives transaction data from the merchant and/or merchant acquirer. The TPS may also identify additional data associated with the subject transaction, such as, for example, one or more of (1) information about a computing device used to conduct the subject transaction ("device information", e.g., geo-location data of the device Internet protocol (IP) address), (2) additional payment card information not included in the transaction data ("payment card information"), (3) information about a digital wallet used to conduct the subject transaction ("digital wallet information", e.g., whether and/or how often this particular device has been used in conjunction with this digital wallet), and (4) cart data associated with the subject transaction ("cart data"). This additional data may also be individually or collectively referred to as infrastructure data, because it refers to the infrastructure used by the TPS to process a transaction, and/or as fraud feature data because, as described below, at least some of this data may be used as part of a fraud- or risk-scoring process.

The TPS transmits the transaction data and infrastructure data to the RBD system for scoring. The RBD system is configured to score the riskiness of the subject transaction and determine whether or not additional authentication should be initiated. More specifically, the RBD system scores the subject transaction based at least in part on the transaction data and the infrastructure data. If the score is below the pre-defined threshold (i.e., "less risky"), then the transaction will be approved at this stage and subsequently will continue through to authorization without additional authentication of the suspect consumer. If the score is above a pre-defined threshold (i.e., "more risky"), then the transaction will undergo additional, direct authentication of the suspect consumer (e.g., a 3DS "step-up" challenge). In the former case, the merchant may maintain liability for the subject transaction, but under the knowledge that the RBD system has analyzed the transaction for fraud prior to completion. In the latter case, the suspect consumer is challenged during the transaction, thus providing additional authentication of the suspect consumer in those situations where the transaction seems most risky.

At least one of the technical problems addressed by this system includes: (i) high network load based at least in part on step-up challenging most or all card-not-present transactions which results in network delays and reduced bandwidth; (ii) allowing fraudulent transactions to be successfully processed if there is no step-up challenge of a card-not-present transaction; (iii) consumer inconvenience during card-not-present transactions based at least in part on having to answer an additional authentication challenge during a transaction; (iv) abandonment of transactions by consumers when faced with a step-up challenge, thus leading to lost sales for merchants and lost processing fees for the other network parties based on those abandoned transactions; (v) unavailability of customizable fraud-related services to merchants and/or merchant acquirers; (vi) increased risk with merchant liability for fraudulent transactions; (vii) digital wallet-related fraud; (viii) issuers having limited access to some data that may be used to fraud-score transactions.

A technical effect of the systems and processes described herein is achieved by performing at least one of the following steps: (i) receiving a request for authentication of the payment card transaction, the payment card transaction including a suspect consumer presenting a payment card from a digital wallet of a privileged cardholder; (ii) identifying fraud feature data from the digital wallet; (iii) computing a fraud score for the payment card transaction based at least in part on the fraud feature data; and (iv) providing the fraud score for use during authentication of the suspect consumer.

The technical effect achieved by this system is at least one of: (i) reducing the amount of network and computing resources needed to reduce the number of fraudulent transactions processed by the payment network; (ii) reducing the number of fraudulent transactions being processed; (iii) reducing consumer inconvenience during card-not-present transactions; (iv) reducing the number of transactions that are abandoned by consumers when faced with an additional authentication challenge, and thus reducing lost sales for the merchant and reducing lost fees for the other network parties based on those abandoned transactions; (v) enabling liability shift to issuing banks for some transactions; (vi) providing additional fraud-related data to issuers during authentication and/or authorization of transactions; (vii) including digital wallet-related data in fraud scoring of transactions; (vii) providing a risk-based decisioning service to issuers that includes digital wallet-related data; (viii) providing a risk-based decisioning service to merchants and/or merchant acquirers when issuers are not participating; (ix) enabling merchants and/or issuers to customize how their transactions are risk-scored and authenticated. For example, network resources and computing resources are reduced by reducing the number of step-up challenges being performed, and thus the number of messages transmitted and processed across the network. Instead of requiring a step-up challenge on each and every card-not-present transaction, the present system intelligently determines which transactions require the step-up challenge and which do not. One or more of the parties to the transaction are benefitted by the system by, for example, less burden on the consumer to further authenticate themselves during the transaction, and fewer abandoned transactions for the merchant (e.g., lost sales), and for the acquiring bank, network, and issuer (e.g., lost transaction processing fees).

As used herein, the term "authentication" (or an "authentication process") is used generally to refer to a process conducted on a payment transaction prior to the "authorization" of a transaction (or an "authorization process"). At least one purpose of the authentication process is to evaluate whether or not the person conducting the transaction (the "suspect consumer") is actually a person privileged to use the payment card presented in the transaction (the "privileged cardholder"). For example, issuers may want to authenticate an online transaction to evaluate whether or not the user of a computing device conducting the online transaction is really the privileged cardholder. An authentication process may be used to reduce fraudulent transactions, and thus protect one or more parties to the transaction (e.g., the merchant, or the issuer of the subject payment card).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions and, more specifically, for providing fraud scoring services for card-not-present transactions during user authentication and/or payment authorization of a payment-by-card transaction (e.g., online transactions involving a digital wallet). Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

In some embodiments, the payment card transaction is a card-not-present transaction conducted, for example, with a payment card in a digital wallet. Network 28 includes a risk-based decisioning (RBD) module (not separately shown in FIG. 1) that is configured to analyze various data associated with the payment card transaction and provide various services to one or more parties involved in the payment card transaction, such as merchant 24 and issuer 30. In one embodiment, during an authentication process for the payment card transaction, the RBD module generates a risk score for the payment card transaction using payment card data, device information, and digital wallet information used during the transaction. In another embodiment, the RBD module generates and transmits extension messages to an issuer in a 3DS protocol for use by the issuer to determine, using their own risk-based decisioning system, whether or not to prompt the cardholder for a further verification (e.g., issue a step-up challenge). The messages include elements of data from one or more of the payment card data, the device information data, and the digital wallet information. In yet another embodiment, the RBD module scores the payment card transaction on behalf of the merchant and provides notification to the merchant regarding transaction risk.

Figure 2:
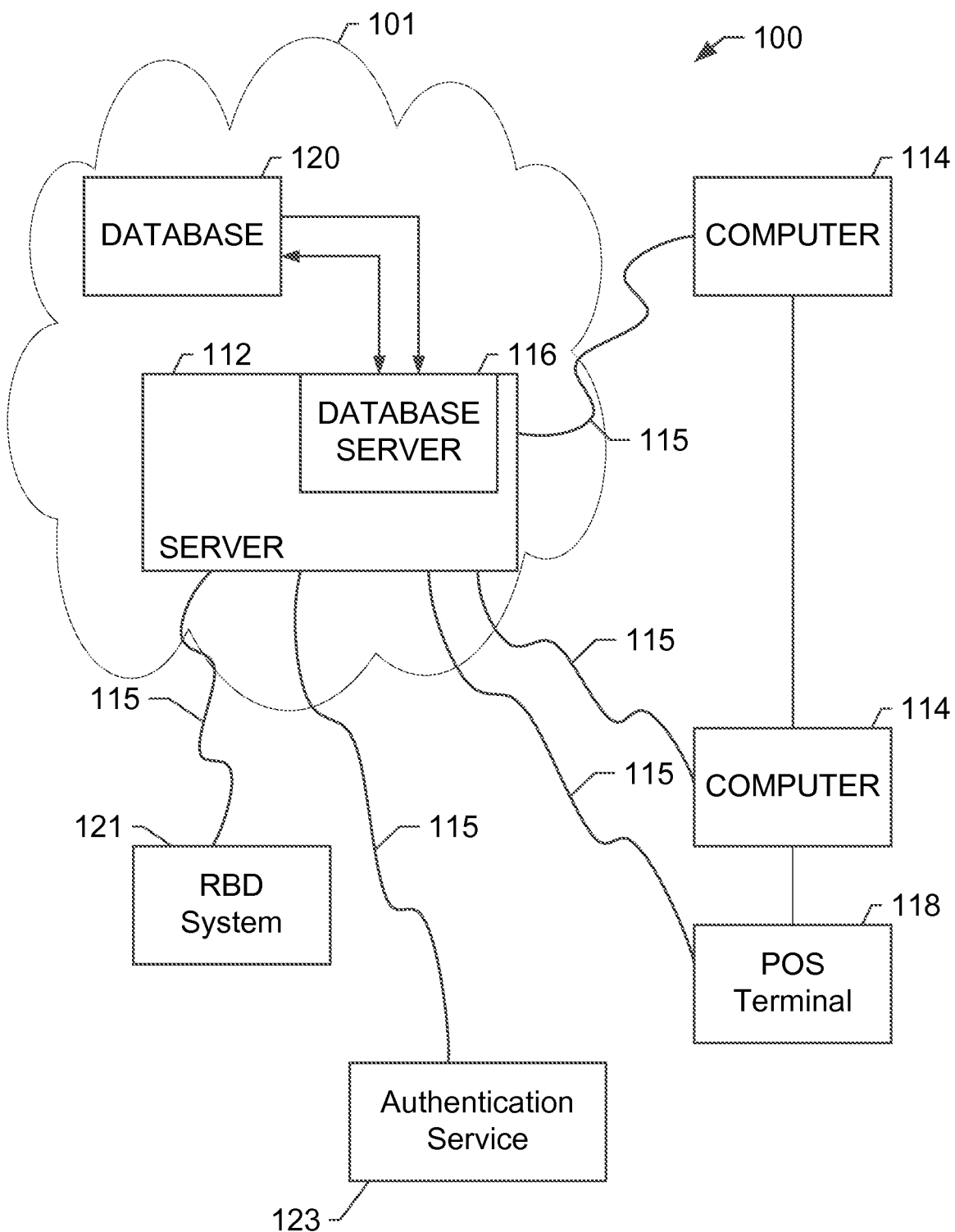

FIG. 2 is a simplified block diagram of an example transaction processing system (TPS) 101 for providing risk-based decisioning services using an RBD system 121 to merchants and/or merchant acquirers in payment network 100. In some embodiments, network 100 is similar to payment network 20 (shown in FIG. 1). In the example embodiment, network 100 includes a plurality of computer devices connected in communication in accordance with the present disclosure. Network 100 includes a server system 112 of TPS 101 in communication with a point-of-sale (POS) terminal 118 at a merchant location 24 (shown in FIG. 1), and/or other client systems 114 associated with merchants, merchant banks, payment networks, and/or issuer banks.

More specifically, in the example embodiment, TPS 101 includes a server system 112 of, for example, a payment processing network 28, in communication with a point-of-sale (POS) terminal 118 at a merchant location 24, and/or other client systems 114 associated with merchants, merchant banks, payment networks, and/or issuer banks Server system 112 is also in communication with a plurality of client sub-systems, also referred to as client systems 114. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

In the example embodiment, TPS 101 also includes POS terminals 118, which may be connected to client systems 114 and may be connected to server system 112. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store digital wallet information, device information, payment card information, scoring rules, risk thresholds, and other data involved with providing risk-based decisioning to one or more parties to the transaction.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28 or a payment processor. In the example embodiment, server system 112 is associated with a network interchange, such as interchange network 28, and may be referred to as an interchange computer system or a payment processing computing device. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In some embodiments, TPS 101 is in communication with RBD system 121 and an authentication service 123. In some embodiments, RBD system 121 and/or authentication service 123 are third-party systems. In other embodiments, one or more of RBD system 121 and/or authentication service 123 may be a part of TPS 101. In some embodiments, RBD system 121 and/or authentication service 123 are in communication with each other and may directly interact during the processing of payment card transactions. In the example embodiment, RBD system 121 performs fraud scoring on payment card transactions, and authentication service 123 provides additional authentication services for suspect consumers during the payment card transaction if RBD system 121 generates a score above a pre-defined threshold (i.e., indicating that the transaction is of greater risk from a fraud perspective). In some embodiments, RBD system 121 and/or authentication service 122 are also in communication with a merchant system and/or an issuer system (e.g., computer 114) and/or POS terminal 118 of the merchant.

Figure 3:
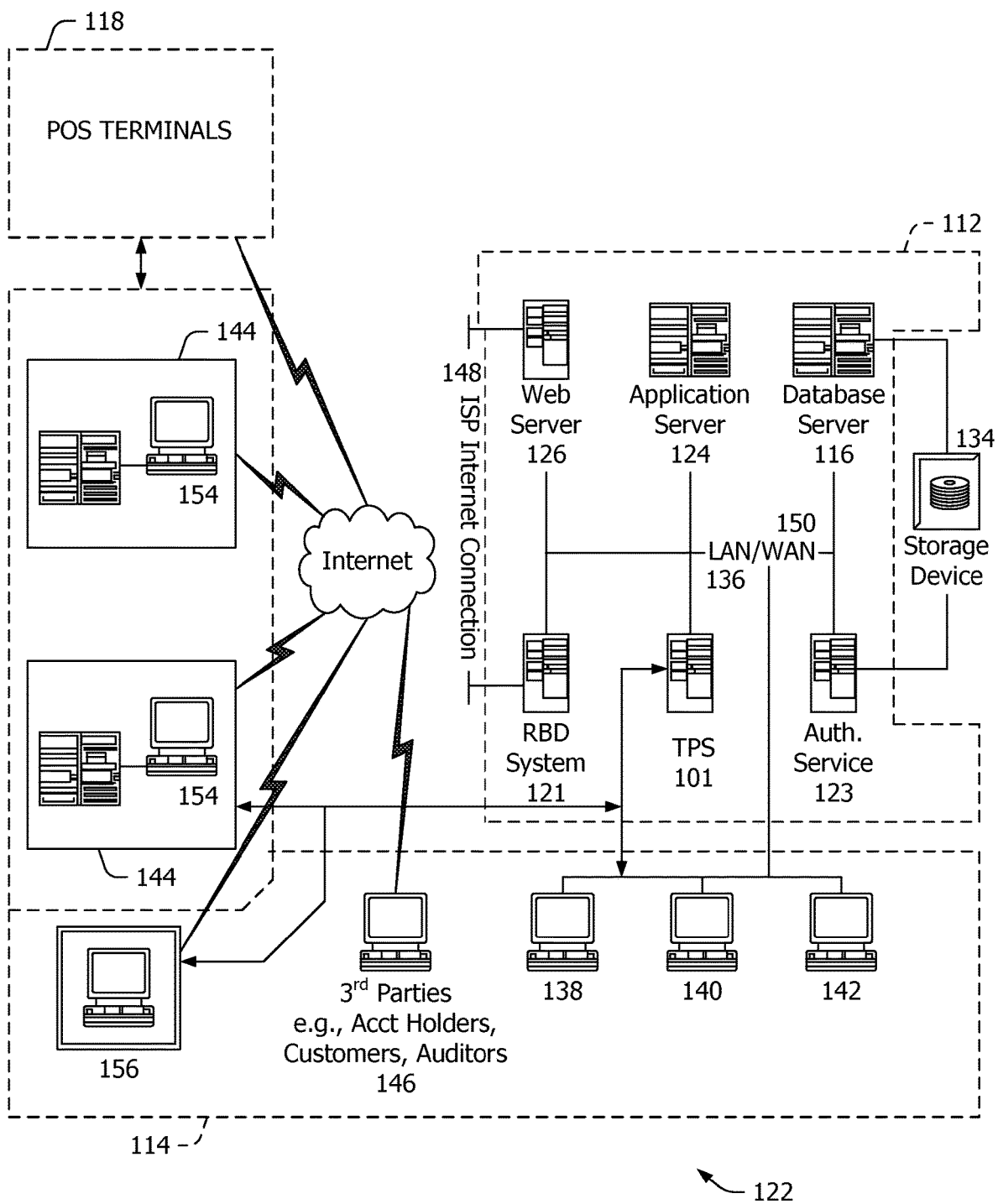

FIG. 3 is an expanded block diagram of an example embodiment of a server architecture of a transaction processing network 122 including a transaction processing system (TPS) 101, an RBD system 121, and an authentication service 123, that may be used to perform various authentication services for a payment card transaction. Components in system 122, identical to components of system 100 (shown in FIG. 2), are identified in FIG. 3 using the same reference numerals as used in FIG. 2. Transaction processing system 122 includes server system 112, client systems 114, and POS terminals 118. Server system 112 further includes database server 116, a transaction server 124, and a web server 126. A storage device 134 is coupled to database server 116 and directory server 130. Servers 116, 124, and 126 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
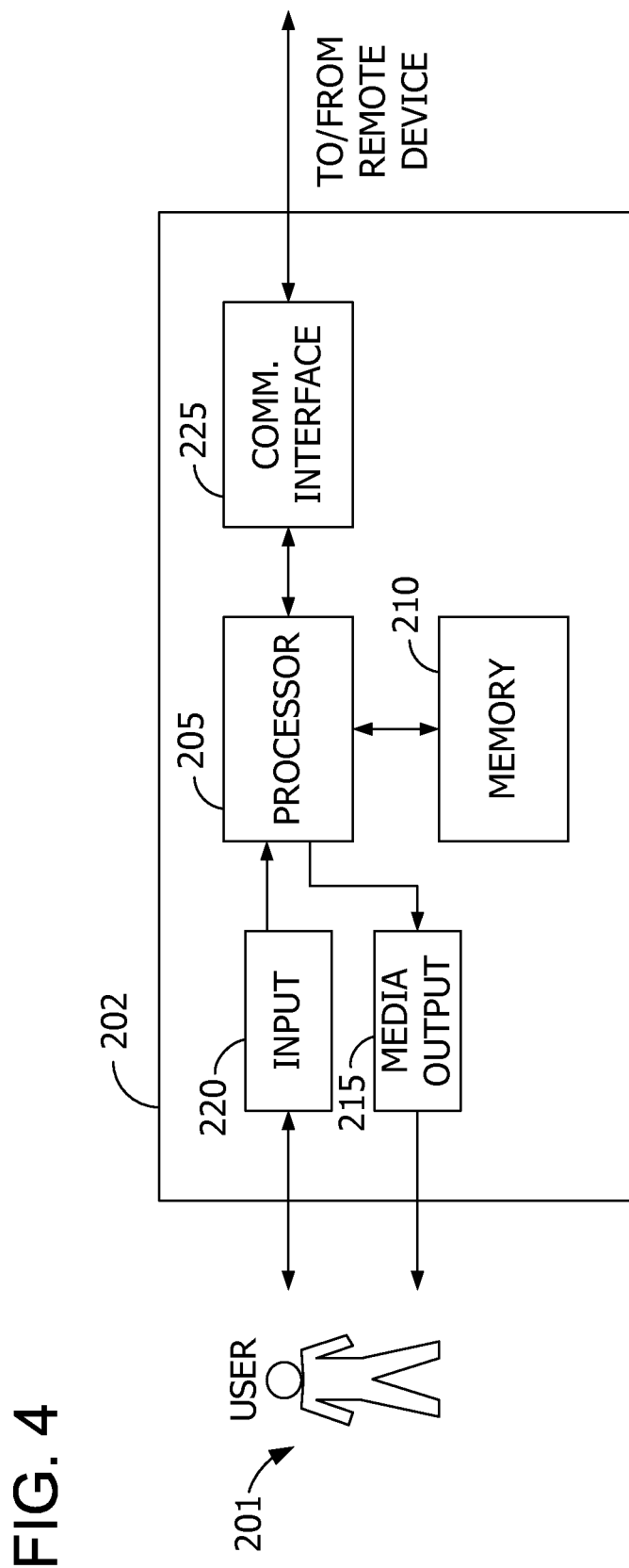

FIG. 4 illustrates an example configuration of a user system 202 operated by a user 201, such as cardholder 22 (shown in FIG. 1). In some embodiments, user system 202 is a merchant system and/or a merchant POS device. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

In the example embodiment, computing device 202 is a user computing device from which user 201 engages with a digital wallet (not shown in FIG. 3), an online merchant (e.g., merchant 24, shown in FIG. 1), a network (e.g., network 28, shown in FIG. 1), and an issuer of a payment card (e.g., issuer 30, shown in FIG. 1) to perform a transaction which undergoes a user authentication process.

Figure 5:
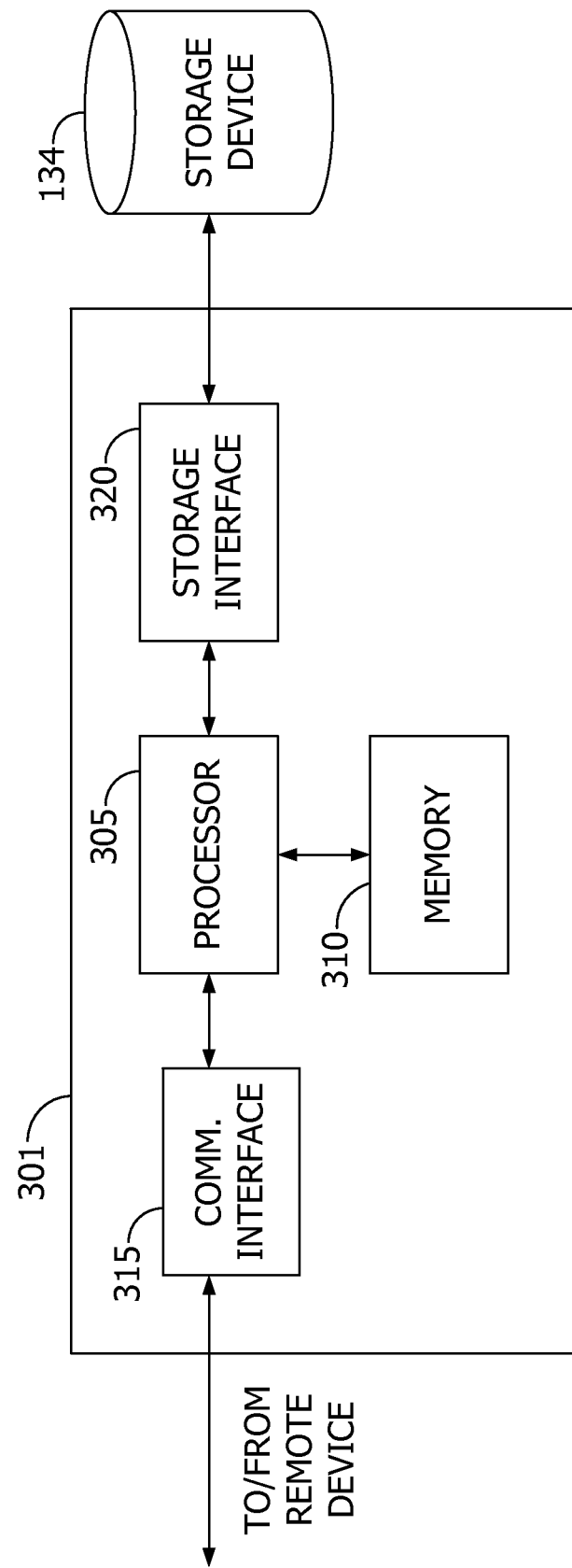

FIG. 5 illustrates an example configuration of a server system 301 such as server system 112 (shown in FIGS. 2 and 3). Server system 301 may include, but is not limited to, database server 116, web server 126, application server 124, RBD system 121, TPS 101, and/or authentication service 123.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as user system 202 (shown in FIG. 4) or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In the example embodiment, server system 301 is a risk-based decisioning (RBD) system in communication with one or more of issuer 30 and merchant 24 during a payment card transaction involving a digital wallet of a user. RBD system 301 performs risk analysis of the payment card transaction and provides one or more authentication-related services during the transaction.

Figure 6:
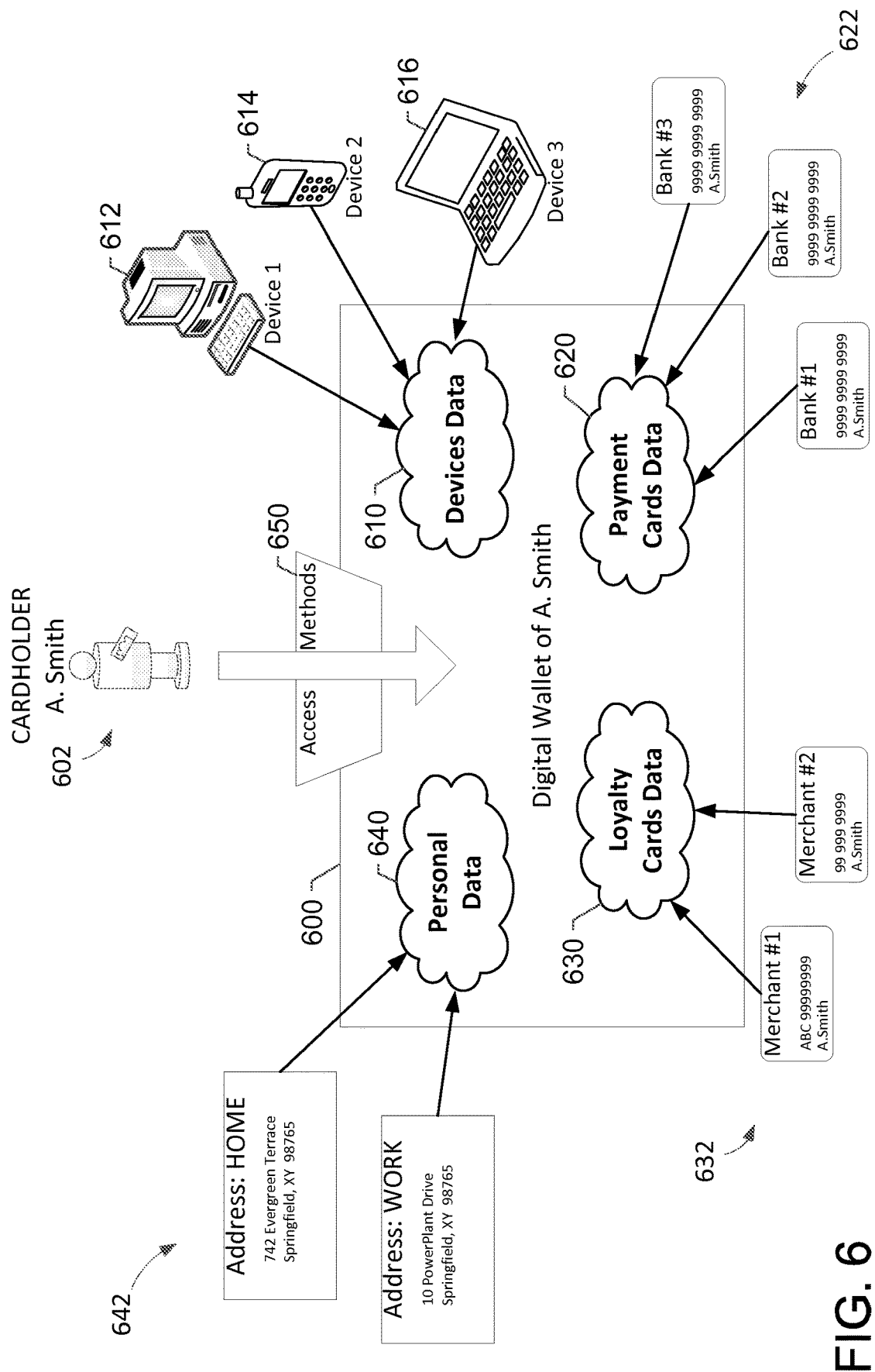

FIG. 6 is a diagram of an example digital wallet 600 of a cardholder 602. During a payment card transaction, a suspect consumer (not shown) presents a payment card 620 from digital wallet 600 to a merchant (e.g., merchant 24, shown in FIG. 1) to purchase goods or services. A risk-based decisioning (RBD) module (not shown in FIG. 6) uses various data about digital wallet 600 to perform one or more authentication services associated with the payment card transaction. In other words, the RBD module will help determine whether or not the suspect consumer (i.e., the person using digital wallet 600 during this transaction) is the privileged cardholder (e.g., cardholder 602, "A. Smith").

In the example embodiment, digital wallet 600 includes devices data 610, payment cards data 620, loyalty cards data 630, and personal data 640. Digital wallet 600 may also include access method data, biometric data, and behavioral information. Some or all of this data may be stored in a centralized database (e.g., database 120, shown in FIG. 2), on a user's device (e.g., device 612), at network 28, merchant 24, and/or issuer 30 (all shown in FIG. 1). This data may also be individually or collectively referred to as infrastructure data, because it refers to the infrastructure used by the TPS to process a transaction, and/or as fraud feature data because, as described below, at least some of this data may be used as part of a fraud- or risk-scoring process.

Device data 610 includes data about devices somehow associated with digital wallet 600. Device data 610 may include data associated with one or more devices 612, 614, 616 that have historically been used during past payment card transactions. Further, device data 610 may include data about a device currently being used for a present payment card transaction. For example, devices data 610 may include an Internet Protocol (IP) address, a media access control (MAC) address, or other identifier that may be used to identify particular devices 612, 614, 618. In some embodiments, device data 610 may include a fraudulent device status (e.g., whether the device has been involved in past fraudulent transactions).

Digital wallet 600, in the example embodiment, also includes payment cards data 620 for one or more payment cards 622. During the life of a digital wallet, cardholder 602 may enter one or more payment cards 622 into digital wallet 600 for use in payment card transactions. Payment cards data 620 may include, for example, payment card authorization numbers (PANs), expiration dates, issuing bank names, associated security codes (e.g., a CVC2 code), cardholder name, tokens representing or otherwise associated with payment cards, and other data associated with payment cards 622.

In some embodiments, payment cards data 620 includes which payment cards 622 were used with which devices 612. Further, in some embodiments, payment cards data 620 includes an age of payment card 622 within digital wallet 600. In other words, digital wallet 600 tracks how long each payment card 622 has been loaded into digital wallet 600. Further, in some embodiments, payment cards data 620 includes a history of card authentications for payment cards 622. For example, one payment card may have been successfully or unsuccessfully 3DS-authenticated, or secure-code authenticated, several times in the past. For example, if a payment card is used from digital wallet 600 for a past legitimate transaction (e.g., one not associated with a chargeback) then, controlling for all other variables, a subsequent transaction with that payment card/digital wallet may be scored in such a way indicating that the subsequent transaction is less risky from a fraud perspective. Similarly, if there are fraudulent transactions and/or transactions that result in a chargeback, then the subsequent transaction with that payment card/digital wallet may be scored in such a way indicating that the subsequent transaction is risker from a fraud perspective. Such data may be tied to a particular payment card, a particular digital wallet, and/or a particular device.

In some embodiments, payment cards data 620 includes data indicating how payment cards 622 were loaded into digital wallet 600 (e.g., manually entered by a user, loaded by the issuing bank or the digital wallet provider). In some embodiments, payment cards data 620 includes status data for payment cards 622 (e.g., whether a card is "blacklisted", has a prior history of fraudulent transactions, has a clean prior history). In some embodiments, payment cards data 620 includes transaction amount limits, daily spending limits, weekly spending limits, and/or a number of transactions limit associated with payment card 622. In some embodiments, payment cards data 620 includes the number of wallets into which a particular payment card 622 has been loaded, and/or a number of merchant sites into which the particular payment card has been loaded.

In some embodiments, device data 610 and/or payment card data 620 may include a recognized secure element such as, for example, a token associated with a particular device and/or payment card (e.g., as with MasterCard® Digital Enablement Service (MDES), or Digital Secure Remote Payments (DSRP)). In some embodiments, this secure element may be provided by a piece of hardware such as a separate computing device that is separated from the device being used in the payment card transaction. For example, during a prior payment card transaction involving digital wallet 600, the secure element is generated and/or validated as a part of the transaction, and subsequently associated with digital wallet 600 (e.g., as a part of device data 610 or payment card data 620). Then during a later transaction, a current secure element provided as a part of the transaction (e.g., by a mobile phone accessing digital wallet 600 for the transaction) may be compared to the prior secure element in device data 610 and/or payment card data 620. If the current secure element is recognized as previously used, the current transaction may be scored "less risky" than the alternative. As such, this may also result in an improved cardholder experience, as it may decrease the likelihood of a step-up challenge to the cardholder.

In the example embodiment, digital wallet 600 also includes loyalty cards data 630 for one or more loyalty programs. Some merchants provide loyalty ("rewards") programs for their regular customers, such as to incentivize more purchases by the accountholder (e.g., cardholder 302). Some digital wallets, including the example digital wallet 600, enable cardholders 602 to load loyalty cards 632 into the digital wallet (in addition to payment cards 622). As such, loyalty cards data 630 includes data such as an account number (i.e., unique identifier identifying the cardholder's account), a merchant name, and a cardholder name.

Digital wallet 600, in the example embodiment, also includes personal data 640 associated with cardholder 602. Digital wallet 600 and/or merchants 24 may store personal information that is regularly used in payment card transactions so that, for example, cardholder 602 can more easily populate data into a payment card transaction rather than have to remember and/or manually enter such data. For example, personal data 640 may include addresses 642 of cardholder 602, such as a home address and a work address, which may be regularly reused as mailing addresses for digital wallet purchases.

In some embodiments, personal data 640 may also include (1) information about digital wallet 600 such as, for example, (a) an account age for digital wallet 600 (e.g., how long digital wallet has been open and/or active), and (b) a provider of digital wallet 600. In some embodiments, personal data 640 includes (2) one or more email addresses and/or phone numbers associated with cardholder 602. In some embodiments, personal data 640 may include (3) information associated with a plurality of privileged cardholders 602, such as spouses.

Additionally, in some embodiments, personal data 640 may include transaction data associated with the present transaction, such as a transaction type of the present transaction. The transaction type may include E-Commerce, mobile payment using QR code, mobile payment using near-field communication (NFC), mobile payment using Bluetooth low energy (BLE), and/or mobile payment using another technology. Further, the transaction type may also include an application programming interface (API) designation used by the merchant. For example, some merchants may use a particular checkout type that utilizes a risk-based decisioning system (e.g., as described below), while other merchants may utilize data stored in the digital wallet, paired with the merchant, and then requested by the merchant at the time of the transaction.

Further, in the example embodiment, cardholder 602 (or the suspect consumer) accesses digital wallet 600 through one or more access methods 650. At least some digital wallets provide multiple avenues of access, or methods of authenticating into the digital wallet. In some embodiments, cardholder 602 may authenticate into digital wallet 600 through the wallet provider. For example, the wallet provider may be an issuing bank, and may provide a user name and password to cardholder 602, and cardholder 602 may subsequently use that user name and password as an access method 650. In some embodiments, cardholder 602 may authenticate into digital wallet 600 through a merchant site (e.g., using a merchant-provided account). For example, cardholder 602 may have a user name and password with a merchant's web site. During an online shopping experience, cardholder 602 may login to the merchant's web site, select items for purchase, and select digital wallet 600 for use in completing payment. Digital wallet 600 may associate cardholder's 602 merchant login account with cardholder 602 and, as such, may "trust" the merchant login authentication as a successful authentication (and access method) into digital wallet 600. In some embodiments, the digital wallet provider may require an additional authentication into digital wallet 600 using the digital wallet provider's authentication service prior to "trusting" the merchant login as authentication into digital wallet 600. In some embodiments, cardholder 602 may authenticate into digital wallet 600 through a payment network such as network 28. For example, network 28 may provide a user authentication mechanism for authenticating cardholder 602 and, as such, cardholder 602 may be authenticated into digital wallet 600 through this access method.

In some embodiments, digital wallet 600 also includes biometric data associated with cardholder 602, payment cards 622, loyalty cards 632, and/or devices 612. Such biometric data may include, for example, biometric reference samples such as cardholder's 602 registered (authentic) fingerprint or iris image that may be used to authenticate a suspect consumer during a payment card transaction. Further, in some embodiments, digital wallet 600 includes behavioral information associated with cardholder 602, digital wallet 600, devices 612, payment cards 622, loyalty cards 632, and/or personal data 640. For example, digital wallet 600 may include past use data, behavioral information, transaction history, or other behavioral data for each of these elements.

Figure 7:
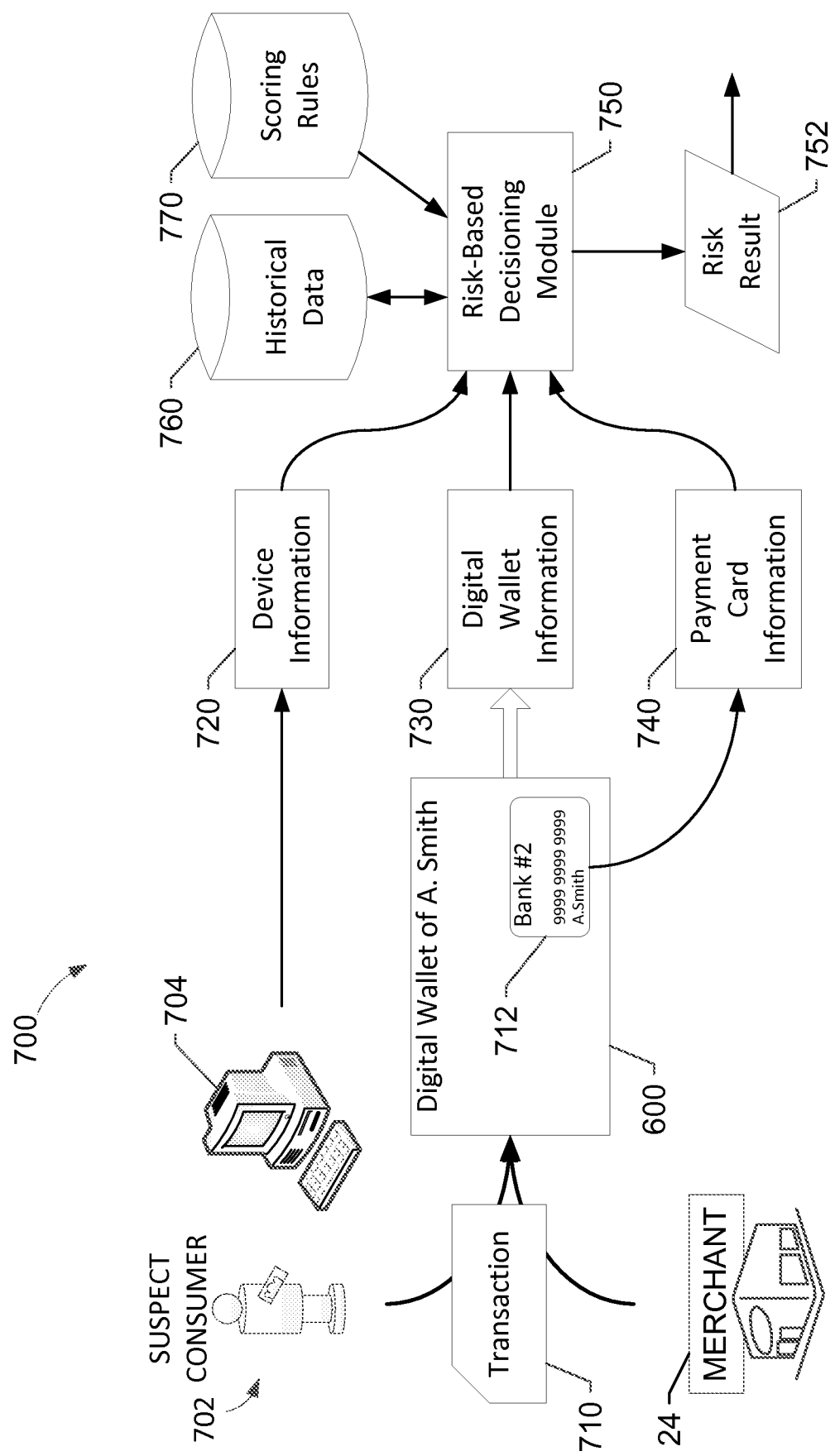

FIG. 7 is a data flow diagram 700 of an example risk-based decisioning (RBD) module 750 which generates a risk result 752 ("risk score") for a transaction 710 involving a digital wallet such as digital wallet 600. In some embodiments, RBD module 750 is similar to RBD system 121 (shown in FIGS. 2 and 3). In the example embodiment, a suspect consumer 702 engages in transaction 710 with merchant 24 using digital wallet 600. For example, suspect consumer 702 may use computing device 704 to login to a website of merchant 24 and select digital wallet 600 for use in completing transaction 710. More specifically, suspect consumer 702 may select a specific bank card 712 within digital wallet 600 to complete transaction 710. RBD module 750 is configured to determine if suspect consumer 702 is the privileged user of digital wallet 600 and/or payment card 712 (e.g., cardholder 602).

In the example embodiment, RBD module 750 generates risk result 752 based at least in part on one or more sources of information about transaction 710. RBD module 750 is configured to consider fraud feature data such as device information 720, digital wallet information 730, and payment card information 740 when evaluating risk associated with transaction 710. In some embodiments, historical data 760 and scoring rules 770 may also be considered. Further, in some embodiments, risk result 752 includes one or more of (1) a numerical risk value computed for transaction 710 as a whole, and (2) a risk level indicator for transaction 710 as a whole, (3) one or more risk level indicators and/or numerical risk values for one or more of (a) a device score (e.g., for device 704), (b) a digital wallet score (e.g., for digital wallet 600), and (c) a payment card score (e.g., for payment card 712).

In some embodiments, some or all of device information 720 may be received from one or more sources such as, for example, a merchant system, an issuer system, a digital wallet provider system, a third party device scoring system, and/or the suspect consumer's 702 device 704. Additionally, in some embodiments, some or all of digital wallet information 730 may be received by RBD module 750 from one or more sources such as, for example, a payment transaction processing system such as described in reference to FIG. 10 and a third party system such as a digital wallet provider system, and/or RBD module 750 may have direct access to some or all of digital wallet information 730. Further, some or all of payment card information 740 may be received by RBD module 750 from a third party system such as a payment network system, the payment transaction processing system described in reference to FIG. 10, a merchant system, and an issuer system, and/or RBD module 750 may have direct access to some or all of payment card information 740.

Figure 8:
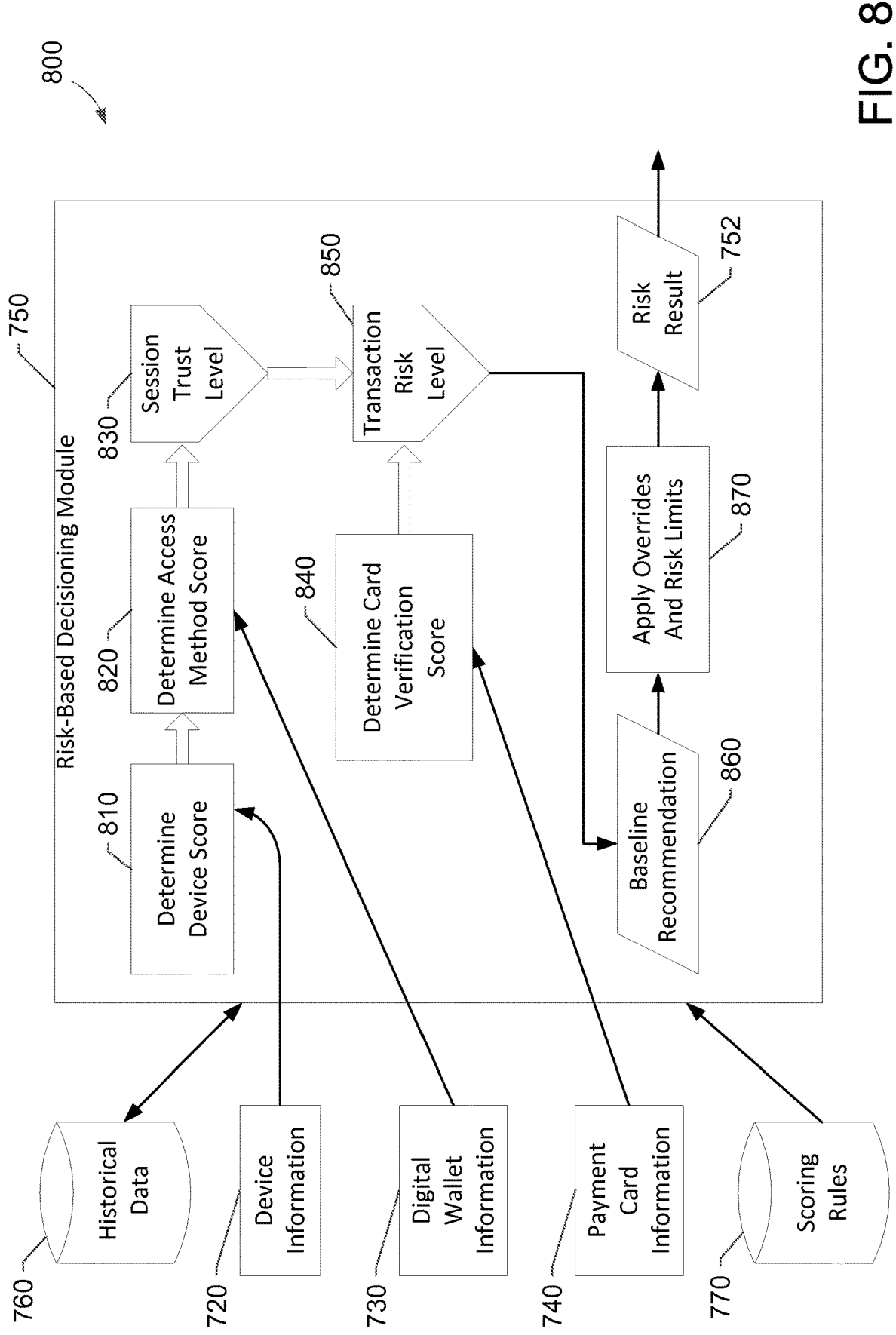

FIG. 8 is a process diagram of an example process 800 for computing risk result 752 for a digital-wallet based payment card transaction such as transaction 710 (shown in FIG. 7). In the example embodiment, risk-based decisioning (RBD) module 750 performs process 800 on a computing device such as server 112 (shown in FIG. 2) while in communication with network 28. In some embodiments, RBD module 750 is in communication with one or more additional computing systems such as a merchant system, an issuer system, or one or more third-party systems.

In the example embodiment, RBD module 750 determines a device score at step 810 using at least device information 720. The device score represents one factor of risk-based evaluation, where the device score focuses on the computing device being used in the transaction (e.g., computing device 704, shown in FIG. 7). In other words, the device score relates to how much more or less likely the transaction is to be risky (e.g., fraudulent) based on information about the suspect consumer's computing device (i.e., whether or not the device is trustworthy). In the example embodiment, the device score is a level determined from the tiered set of "Basic/Can't Tell", "Good", and "Excellent". In some embodiments, RBD module 750 may communicate with a third party system for at least some device scoring. RBD module 750 may provide at least some device information 720, digital wallet information 730, and/or payment card information 740 to the third party system.

RBD module 750, in the example embodiment, also determines an access method score at step 820 using at least digital wallet information 730. The access method score represents a factor of risk-based evaluation, where the access method score focuses on data involving the digital wallet being used in the transaction (e.g., digital wallet 600, shown in FIGS. 6 and 7). In other words, the access method score relates to how much more or less likely the transaction is to be risky (e.g., fraudulent) based on information about the suspect consumer's digital wallet (i.e., whether or not the use of the digital wallet, or particular aspects of the digital wallet, is trustworthy).

In the example embodiment, the access method score is a level determined from the tiered set of "None", "Basic", "Good", "Excellent", and "Trusted". RBD module 750 determines an access method score based at least in part on the access method that the suspect consumer used to authenticate into the digital wallet in use during the subject transaction. Several different avenues of access, or access methods 650, are described above in reference to FIG. 6. RBD module 750 determines the particular access method used by suspect consumer 702 to authenticate with digital wallet 600 during transaction 710 and assigns a particular level based at least in part on that access method. For example, if suspect consumer 702 authenticated by providing a biometric image that was subsequently confirmed as authentic, then RBD module 750 may assign an "Excellent" level to the access method score. For another example, if suspect consumer 702 authenticated with a login name and password directly with the digital wallet provider, then RBD module 750 may assign a "good" level to the access method score. This may be lower (i.e., considered "more risky" from a fraud perspective) than other levels because, for example, some login-based authentication methods may be compromised more easily than some biometric authentication methods (e.g., stolen login names and passwords, easily guessed passwords). For another example, if suspect consumer 702 is cross-authenticated or "trusted" into the digital wallet based on a merchant login, then RBD module 750 may assign a "basic" level to the access method score. This may be lower (i.e., considered "more risky" from a fraud perspective) than other levels because, for example, some merchant sites may have less rigorous standards for authentication into their site (e.g., lax password strength standards, indefinite account lifetimes, longer password expiration times).

In some embodiments, RBD module 750 includes one or more additional digital wallet-based risk factors when determining the access method score. For example, in one embodiment, RBD module 750 examines historical data 760 involving past authentication results involving one or more of the subject payment card (e.g., payment card 712), the subject digital wallet (e.g., digital wallet 600), and/or the subject device (e.g., computing device 704) and alters the access method score based on this historical data. For example, RBD module 750 may adjust the access method score to indicate an increased risk of fraud if the subject payment card was used in a prior recent transaction in which an address verification system (AVS) check or a 3DS step-up was conducted but failed. In some embodiments, RBD module 750 may adjust the access method score based on how recent transactions with this payment card were authenticated. For example, a recent 3DS verification success may indicate less risk for the current transaction than a recent AVS check, or than a non-verified transaction. As such, RBD module 750 may raise or lower the access method score based on such historical verification data. In some embodiments, RBD module 750 may examine how just the most recent transaction was authenticated, and the associated results.

In another embodiment, RBD module 750 examines past devices used during transactions involving the subject digital wallet. For example, if the subject device (e.g., computing device 704) has been used several times in past, non-fraudulent transactions, then it is more likely that the subject transaction is non-fraudulent than if, for example, the subject device has never been used with, or otherwise associated to, the subject digital wallet. As such, RBD module 750 may risk-score the subject transaction higher or lower based on perceived risk associated with prior-used devices.

In yet another embodiment, RBD module 750 examines how long the subject digital wallet has been in active service (e.g., how old account is), and/or the transaction volume associated with the subject digital wallet (e.g., how many total transactions have been completed, or how much total has been spent), and/or how many times the user has authenticated into the subject digital wallet. For example, if the subject digital wallet has been recently created and/or has a low volume of transactions, then RBD module 750 may risk-score the subject transaction indicating an increased risk of fraud than if the digital wallet had a long lifetime and/or a high volume of transactions.

In still another embodiment, RBD module 750 examines how long the subject payment card (e.g., payment card 740) has been loaded into the subject digital wallet, and/or how the subject payment card was loaded into the wallet. For example, if the subject payment card was recently loaded into the digital wallet, and/or manually loaded into the wallet (e.g., by hand, by suspect consumer 702), then RBD module 750 may risk-score the subject transaction indicating an increased risk of fraud than if the subject payment card was loaded into the wallet long ago, and/or loaded in by a more secure manner (e.g., by an issuer, or by the wallet provider).

In another embodiment, RBD module 750 examines how many cards are loaded into the subject digital wallet, and/or information comparison between multiple cards in the wallet. For example, if the subject digital wallet includes dozens of payment cards 622, and/or the payment cards share differing names or billing addresses, then RBD module 750 may risk-score the subject transaction indicating an increased risk of fraud than if the subject digital wallet only included a few payment cards, and/or the payment cards within the wallet all shared similar names or billing addresses.

In yet another embodiment, RBD module 750 compares a shipping address of the subject transaction to shipping addresses of past transactions associated with the digital wallet. If, for example, the subject shipping address matches a shipping address previously used, and perhaps regularly used, then RBD module 750 may risk-score the subject transaction indicating a reduced risk of fraud than if the subject shipping address were one never used in past digital wallet transactions or otherwise not associated with the subject digital wallet.

Further, in some embodiments, RBD module 750 may combine one or more of the above digital-wallet-based behavioral items for risk-scoring purposes. For example, RBD module 750 may examine how many times a particular payment card has been used from a particular device within this digital wallet's history. RBD module 750 may risk-score the subject transaction lower risk if the subject payment card and the subject device have been used together in numerous past transactions, or may risk-score the transaction higher risk if, for example, the subject device had never been used with the subject payment card.

In some embodiments, the device score may be determined 810 using one or more data elements from digital wallet information 730 and/or payment card information 770. Further, in some embodiments, the access method score may be determined 820 using one or more data elements from device information 720 and/or payment card information.

Referring now to FIG. 8, once a device score and an access method score have been determined, RBD module 750 combines the device score and the access method score to generate a session trust level at step 830. In the example embodiment, as described above, the device score may be one of "Basic/Can't Tell", "Good", and "Excellent", and the access method score may be one of "None", "Basic", "Good", "Excellent", and "Trusted". RBD module 750 generates a session trust level that is one of "Basic", "Good", "Excellent", and "Trusted." More specifically, the following table indicates the resultant session trust level from the two variables of device score ("Device", vertical axis) and access method score ("Access", horizontal axis):

TABLE 1

Session Trust Level

| Device \ Access | None | Basic | Good | Excellent | Trusted |
|---|---|---|---|---|---|
| Excellent | Good | Good | Excellent | Excellent | Trusted |
| Good | Basic | Good | Good | Excellent | Excellent |
| Basic | Basic | Basic | Good | Good | Excellent | where the cross-referenced value (i.e., the value within the cell having the identified device score and access score) is the session trust level for the subject transaction.

In the example embodiment, RBD module 750 determines 840 a card verification score using at least payment card information 740. In some embodiments, card verification score may be determined 840 using one or more data elements from digital wallet information 730 and/or device information 720. The card verification score represents a factor of risk-based evaluation, where the card verification score focuses on the payment card being used in the transaction (e.g., computing device 704, shown in FIG. 7). In other words, the device score relates to how much more or less likely the transaction is to be risky (e.g., fraudulent) based on information about the payment card being presented, account details for the subject payment card, and accompanying transaction data of the subject transaction. In the example embodiment, the card verification score is a level determined from the tiered set of "Neutral/Can't Tell", "Good", "Excellent", and "Trusted". In some embodiments, RBD module 750 may communicate with another system for at least some card verification scoring. The card verification score may be based on factors such as, for example, address information provided by the suspect consumer, how the payment card was loaded or added to the digital wallet, and whether the subject payment card has been used with the subject merchant.

Once RBD module 750 has a session trust level 830 and has determined 840 a card verification score, RBD module 750 combines these two scores into a transaction risk level 850. In the example embodiment, RBD module 750 uses the following table to determine transaction risk level 850 from the two variables of session trust level 830 ("Session", vertical axis) and the card verification score ("Card", horizontal axis):

TABLE 2

Transaction Risk Level

| Session \ Card | Neutral | Good | Excellent | Trusted |
|---|---|---|---|---|
| Trusted | Basic | Excellent | Trusted | Trusted |
| Excellent | Basic | Good | Excellent | Trusted |
| Good | Basic | Good | Good | Excellent |
| Basic | Basic | Basic | Basic | Basic | where the cross-referenced value (i.e., the value within the cell having the identified session trust level 830 and the card verification score) is the overall transaction risk level for the subject transaction. Thus, transaction risk level 850 represents a combination of device score, a digital wallet/access method score, and a card verification score.

In the example embodiment, transaction risk level 850 represents a baseline recommendation 860 generated by RBD module 750. In other words, if no other considerations were included, RBD module 750 would provide baseline recommendation 860 as risk result 752. However, in the example embodiment, RBD module 750 additionally applies 870 one or more overrides and/or risk limits before generating a final risk result 752. In some embodiments, RBD module 750 may provide a default set of rules that are used to generate risk result 752. In the example embodiment, RBD module 750 enables issuer-specific risk limits. In other words, each particular issuing bank may provide its own custom set of rules to be applied by RBD module 750 to generate risk result 752. For example, in one specific embodiment, an issuer customizes the following table of risk limits:

TABLE 3

Issuer Risk Limits

| Transaction Risk Level | Transaction Amount Limit | Daily Spending Limit | Weekly Spending Limit | # Transactions Limit |
|---|---|---|---|---|
| Trusted | no limit | no limit | no limit | no limit |
| Excellent | $1,000 | $2,000 | $10,000 | no limit |
| Good | $250 | $1,000 | $3,000 | 10 |
| Neutral | $100 | $200 | $500 | 5 |
| Negative | all | all | all | all |

Each column of the table represents a particular aspect or characteristic associated with the transaction, the privileged cardholder, or the payment card account (referred to herein as a "transaction aspects"). Each cell within the table may be configured with a threshold level, and each cell may also be associated with a corresponding transaction risk level (e.g., transaction risk level 850). Based on the determined transaction risk level 850, if one or more of the threshold levels is exceeded, RBD module 750 will recommend an additional authentication of the suspect consumer (e.g., 3DS step-up authentication). The threshold levels shown in Table 3 are merely one example. Issuers may elect to use any number of these or other limits at step 870, or none at all.

In the example embodiment, for the subject payment card, RBD module 750 determines a set of risk limits (e.g., table of risk limits) for the subject transaction (e.g., either issuer-specified limits, or default limits). Each set of risk limits may include one or more transaction aspects (e.g., "transaction amount limit", "daily spending limit"). RBD module 750 cross-references each transaction aspect with the determined transaction risk level 850 for the subject transaction to determine an associated threshold limit (e.g., a cell of Table 3). RBD module 750, in the example embodiment, then identifies a reference value associated with each transaction aspect. The reference value is the value that RBD module 750 compares to the threshold value to determine whether or not the transaction aspect has been exceeded. RBD module 750 examines each transaction aspect independently at step 870.

For example, presume an issuer of the subject payment card adopts Table 3, as described above, as their set of risk limits, and presume transaction risk level 850 for the subject transaction is "Good". "Transaction amount limit" is related only to the subject transaction and, more specifically, to the amount of the subject transaction (e.g., in U.S. dollars). As such, the reference value for the "transaction amount limit" is the payment amount identified in the transaction (e.g., presume the subject transaction is for $44.95). RBD module 750 identifies the reference value (e.g., from transaction 710 data), compares the payment amount, $44.95, to the threshold limit for the "Good" risk level, $250, and determines that the subject transaction is below the threshold level. As such, RBD module 750 would not recommend additional user authentication based only on the "transaction amount limit" transaction aspect.

Continuing the same example, presume that the subject payment card has already incurred $975 in purchases earlier on the day of the subject transaction. RBD module 750 evaluates the "daily spending limit" transaction aspect. "Daily spending limit" is related to the subject payment card and, more specifically, to the total amount that has been spent using the subject transaction card on the same day, including the amount of the current transaction. As such, the reference value for the "daily spending limit" is a daily total of transaction amounts for the subject payment card, $975, plus the current amount, $44.95, for a total reference value of $1,019.95. RBD module 750 identifies the reference value (e.g., from historical data 760 and transaction 710 data), compares the reference value of $1,019.95 to the threshold limit for the "Good" risk level, $1,000, and determines that the subject transaction is above the threshold level. As such, RBD module 750 would recommend additional user authentication based only on the "transaction amount limit" transaction aspect.

Similarly, RBD module 750 examines each transaction aspect included in the identified set of risk limits. In the example embodiment, if the subject transaction exceeds any transaction aspect threshold, then RBD module 750 includes a recommendation for additional user authentication in risk result 752. In other embodiments, more than one transaction aspects above threshold are required before a recommendation for additional user authentication is provided in risk result 752.

In some embodiments, issuers may define limits based on payment card account numbers. For example, in one specific embodiment, issuers may define a single set of risk limits (e.g., Table 3) for a specific bank identification number (BIN) range. In some embodiments, a single issuer may have several different sets of risk limits for non-overlapping BIN ranges.

It should be understood that using Tables 1 and 2 for determining session trust level from a device score and an access method score is merely exemplary, and other combinations of scores are possible. Further, in other embodiments, RBD module 750 generates numeric values for one or more of device score, access method score, card verification score, session trust level, and transaction risk level include numeric values rather than, or in addition to, the tiered levels described in the example embodiment above.

In some embodiments, RBD module 750 may enable the "liable parties" (e.g., issuers 28 and/or merchants 24) to customize scoring for their associated transactions. In other words, the liable parties may provide scoring rules 770 that influence one or more of device score 810, method score 820, verification score 840, session trust level 830, and/or transaction risk level 850. For example, one liable party may believe that the device score is a better indicator of fraud than access method or card verifications scores and, as such, may elect to weight the device score more relative to access method score and card verification score. In one embodiment, RBD module 750 may implement a customized Table 1 and/or a customized Table 2 to affect such weighting. In another embodiment, liable parties may weight specific, more granular aspects of each score (i.e., weight the components of each score as to how heavily they contribute to that score). For example, RBD module 750 may enable liable parties to weight the access method used to access a digital wallet relative to how long a payment card has been loaded into a digital wallet. As such, RBD module 750 may provide greater granularity of control to the liable parties, thereby allowing them to influence the risk determination.

Figure 9:
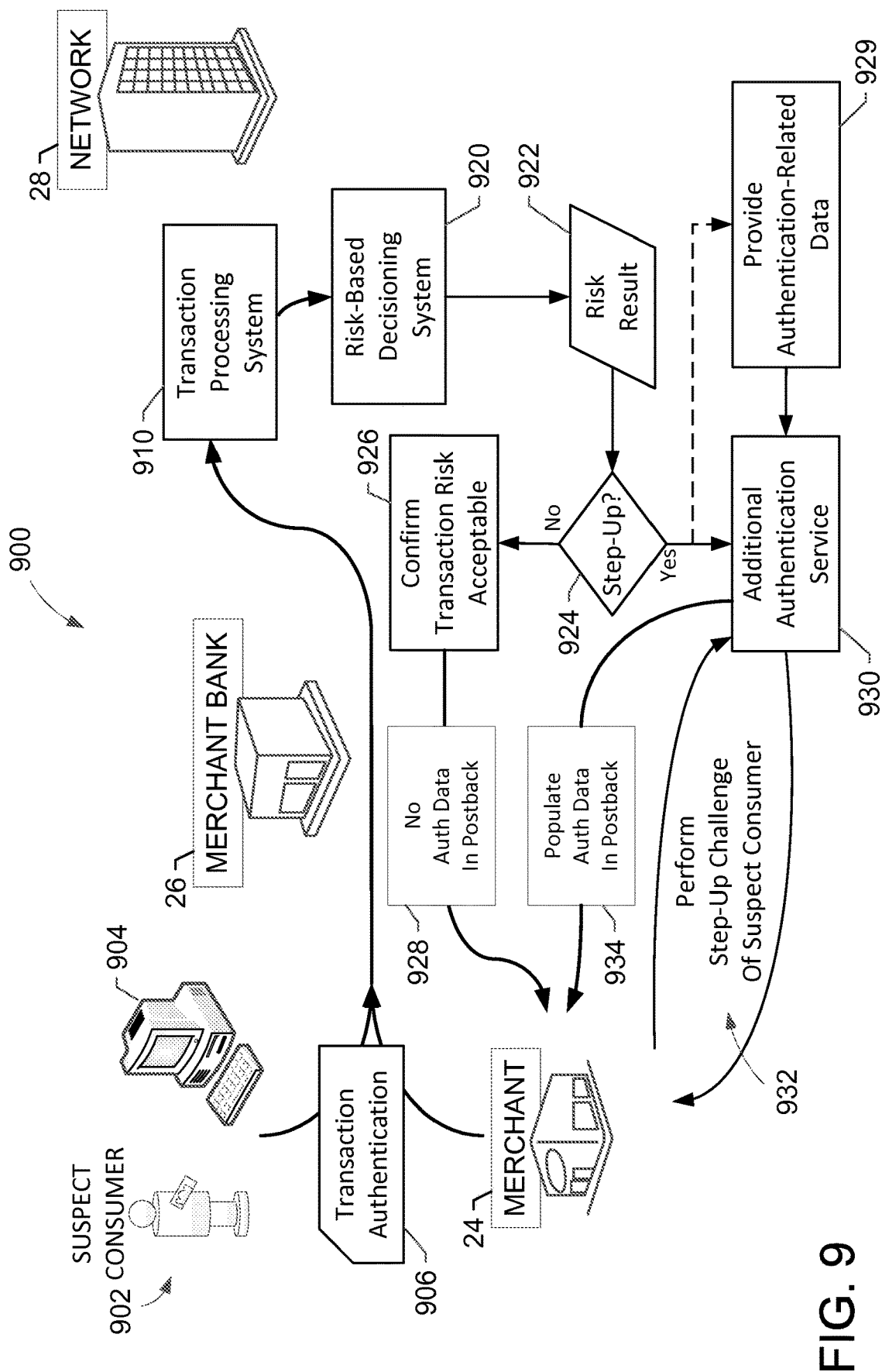

FIG. 9 is a diagram of an example payment network 900 in which a transaction processing system (TPS) 910 facilitates risk-based decisioning of a card-not-present (CNP) payment card transaction (the "suspect transaction" or "subject transaction") between a suspect consumer 902 and a merchant 24. In some embodiments, payment network 900 may be similar to multi-party transaction card industry system 20 (shown in FIG. 1), suspect consumer 902 may be similar to cardholder 602 and/or suspect consumer 702, and TPS 910 may be similar to TPS 122 (shown in FIGS. 2 and 3). In the example embodiment, suspect consumer 902 performs an online payment card transaction with merchant 24 and, during this subject transaction, a transaction authentication request is generated and sent to TPS 910. In some embodiments, TPS 910 is associated with an interchange network such as network 28. In other embodiments, TPS 910 is associated with a third-party processing service such as, for example, a 3-D Secure (3DS) authentication service.

In the example embodiment, TPS 910 transmits a scoring request to a risk-based decisioning (RBD) system 920 for fraud analysis and scoring. In some embodiments, RBD system 920 is a third-party fraud screening service. In other embodiments, RBD system 920 is provided by network 28 or issuer 30 (shown in FIG. 1). In some embodiments, RBD system 920 is similar to RBD system 121 (shown in FIGS. 2 and 3) and/or RBD module 750 (shown in FIGS. 7 and 8). In the example embodiment, the scoring request to RBD system 920 includes infrastructure data such as one or more of transaction data, information about a computing device 904 used to conduct the subject transaction ("device information", e.g., geo-location data of the device Internet protocol (IP) address), additional payment card information not included in the transaction data ("payment card information"), information about a digital wallet used to conduct the subject transaction ("digital wallet information", e.g., whether and/or how often this particular device 904 has been used in conjunction with this digital wallet), and cart data associated with the subject transaction ("cart data").

RBD system 920, in the example embodiment, scores the subject transaction for fraud using at least some of the provided data. More specifically, under Verified Checkout, RBD system 920 generates a risk result 922 (e.g., a risk score) for the transaction. In some embodiments, risk result 922 is similar to risk result 752 (shown in FIGS. 7 and 8). As such, at step 924, if risk result 922 does not include a recommendation to perform additional authentication (e.g., less risky transaction), such as described above with respect to FIG. 8, then no additional authentication of suspect consumer 902 is performed (e.g., no "step-up"). In other embodiments, risk result 922 may be a risk score. As such, at step 924, if the risk score satisfies a first pre-defined threshold (i.e., the risk score indicates that the transaction is less risky), then no additional authentication of suspect consumer 902 is performed (e.g., no "step-up"). TPS 910 thus confirms that the transaction risk is acceptable (e.g., no step-up required) at step 926, no authentication data 928 is included in the post-back to merchant 24, and the merchant is informed and subsequently proceeds to authorization of the payment card transaction. Further, in some embodiments, TPS 910 and/or RBD system 920 may enable merchant 24 and/or issuer 30 to customize authentication scoring as described in reference to FIGS. 6-8.

In the example embodiment, if risk result 922 includes a recommendation for additional authentication of suspect consumer 902, or if the risk score satisfies a second pre-defined threshold, which may be the same as or different from the first pre-defined threshold (i.e., the risk sore indicates that the transaction is more risky), then additional authentication of suspect consumer 902 will be performed. More specifically, TPS 910 initiates (e.g., transmits) a request to an additional authentication service 930, and the authentication service 930 performs an authentication challenge 932 of suspect consumer 902. In some embodiments under Verified Checkout, TPS 910 may include additional extension data 929 when initiating the request to additional authentication service 930, as described in reference to FIGS. 10 and 11. In the example embodiment, additional authentication service 930 is a 3-D Secure provider that performs a step-up challenge of suspect consumer 902. In some embodiments, authentication service 930 is similar to authentication service 123 (shown in FIGS. 2 and 3). After a successful step-up challenge, authentication data 934 (e.g., 3DS values) is populated in the post-back to merchant 24, and merchant 24 proceeds to authorization of the suspect transaction.

In some embodiments, TPS 910 offers to individual merchants 24 and/or merchant banks 26 three options for transaction authentication 906 of CNP payment card transactions: (1) Basic Checkout; (2) Verified Checkout; and (3) Advanced Checkout. Basic Checkout offers a limited level of transaction authentication that does not include an option for additional authentication challenge of suspect consumer 902 (e.g., no 3DS step-up challenge), and thus no liability shift (i.e., the merchant retains liability for the subject transaction). Advanced Checkout, on the other hand, includes liability shift from the merchant, but may also prompt additional authentication challenge of suspect consumer 902. Verified Checkout is a middle ground between Basic and Advanced, in which suspect consumer 902 is only subject to additional authentication challenge if the subject transaction exceeds a certain risk threshold.

In the example embodiment, TPS 910 provides merchants and/or merchant acquiring banks three different check-out choices, along with tiers of risk scoring options. Different merchants may desire different liability responsibilities and/or different consumer experiences for their customers. For example, for some small merchants who conduct small numbers of transactions, every single transaction is important. Such a merchant may desire liability shift to issuers on most or all transactions. On the other hand, large merchants who conduct large numbers of transactions may accept a certain risk of fraudulent transactions in exchange for the expected benefit of not losing the abandoned transactions. As such, TPS 910 provides merchant value in the form of enabling merchants to balance between consumer experience and liability protection. In some embodiments, merchants may select Basic, Advanced, or Verified Checkout for different types of transactions. Merchant may configure a settings profile dictating what types of transactions are processed with which method.

In some embodiments, under Basic Checkout, TPS 910 does not provide additional a consumer authentication challenge option, and no liability shift to issuer is possible (e.g., liability stays with merchant). In such embodiments, RBD 920 may collect data, but may not score, or may only partially score the subject transaction (e.g., device-data only scoring). In some embodiments, a flag "NOTIFY" is provided as a part of the subject transaction, and serves as an indicator, to TPS 910 and/or RBD 920, what check-out choice the merchant has elected for this transaction. In some embodiments, NOTIFY prompts RBD 920 to record risk data (e.g., what card and/or device combination has been used) for future use and not score or only partially score the subject transaction. Thus, RBD 920 may not provide risk result 922 to merchant 24.

In some embodiments, under Verify Checkout, TPS 910 invokes RBD 920 to calculate risk result 922. RBD 920 may provide risk scoring as described above similar to RBD 750 (shown in FIGS. 7 and 8). In some embodiments, RBD 920 may provide scoring with default scoring rules (e.g., one or more default scoring rules stored in a memory of RBD 920), or may apply issuer- or merchant-specific settings (e.g., one or more fraud scoring configuration parameters received from a merchant or an issuer). If, at 924, risk result 922 exceeds a pre-determined threshold, then a step-up challenge 932 may be presented to suspect consumer 902. As such, under Verified Checkout, liability shift from merchant to issuer may not necessarily occur.

In some embodiments, under Advanced Checkout, TPS 910 ensures liability shift to the issuer. TPS 910 invokes RBD 920 to score the subject transaction. Suspect consumer 902 may or may not be challenged 932. If the issuer does not participate in scoring by RBD 920 (e.g., as explained above in reference to FIG. 8), then step-up 924 with additional authentication service 930 may always be performed. If the issuer does participate in scoring by RBD 920 (e.g., by providing to RBD 920 one or more fraud scoring configuration parameters), or performs their own risk-based decisioning to determine whether or not to step-up 924 to challenge suspect consumer 902, then suspect consumer 902 may or may not get challenged 932, based on the results of, for example, risk result 922.

In some embodiments, at least one of TPS 910 and RBD 920 is configured to store an indication of the party liable for the transaction, such that if a dispute arises about the transaction, the indication of liability may be recalled. For example, under Basic Checkout, as described above, the merchant may assume liability. At least one of TPS 910 and RBD 920 may store an indication of merchant liability for each transaction. Under Advanced Checkout, as described above, liability may shift to the issuer. At least one of TPS 910 and RBD 920 may store an indication of issuer liability for each transaction. Under Verified Checkout, as described above, the liability may remain with the merchant for certain (less risky) transactions, for which an indication of merchant liability may be stored, and liability may shift to the issuer for certain (riskier) transaction, for which an indication of issuer liability may be stored.

Figure 10:
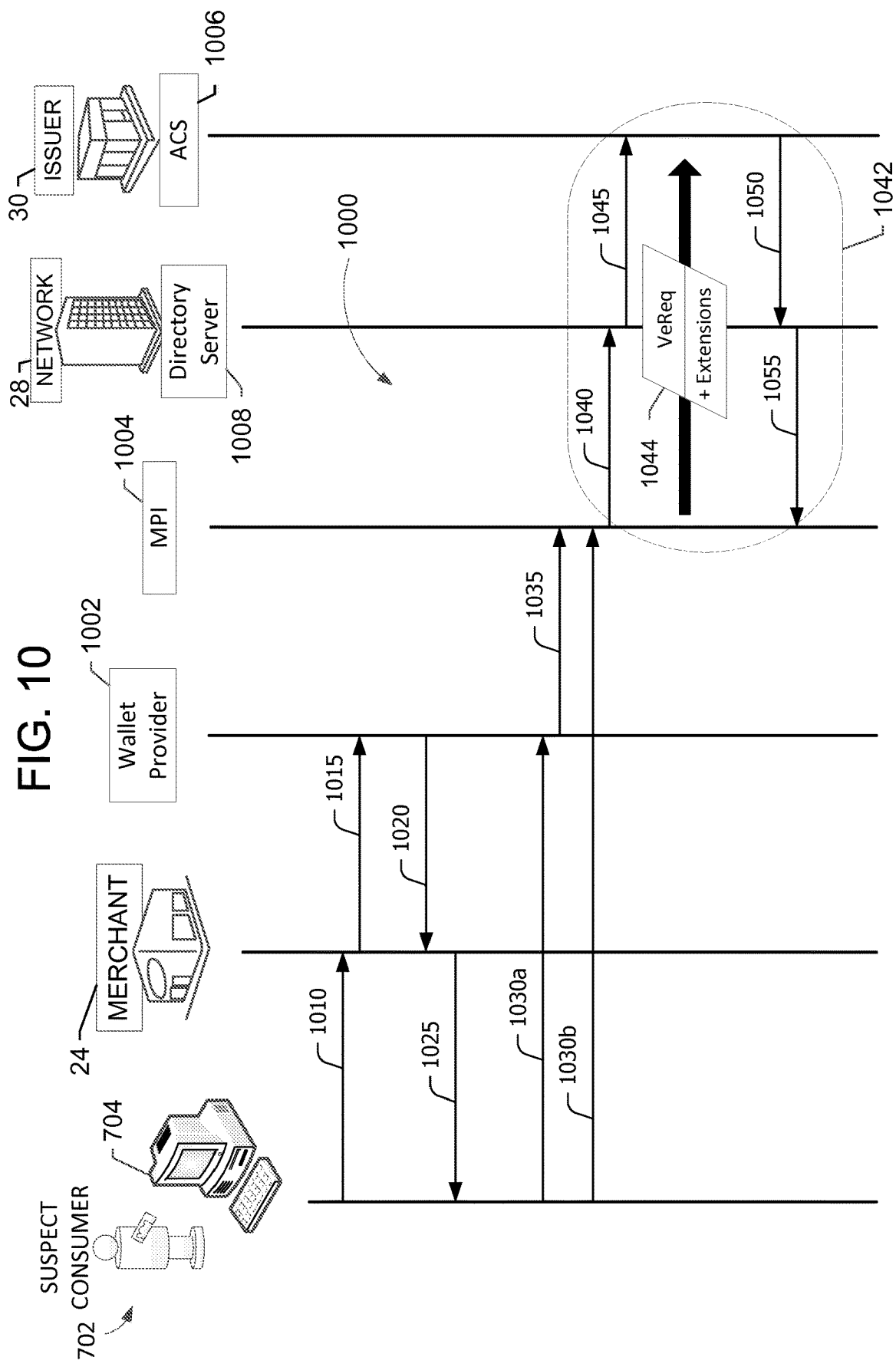

FIG. 10 is a swimlane diagram illustrating an example portion of an authentication request process 1000 that includes providing authentication data to an issuer during transaction authentication. In the example embodiment, an online transaction involving a digital wallet, such as transaction 710 (shown in FIG. 7) involving digital wallet 600, is processed by an interchange network such as transaction environment 20 (shown in FIG. 1)

During the example transaction, at step 1010, suspect consumer 702 commences an online purchase with merchant 24 (e.g., selects a button on the merchant's web site indicating that the user is ready to check out). Suspect consumer 702 selects, for example, digital wallet 600 provided by a wallet provider 1002. At step 1015, the transaction proceeds to wallet provider 1002 (e.g., after suspect consumer 702 logs into digital wallet 600). At step 1020, wallet provider 1002 notifies merchant 24 of the login, and may provide data associated with digital wallet 600 (e.g., a selection of payment cards present available to suspect consumer 702 through digital wallet 600). At step 1025, merchant 24 (e.g., via the merchant's web site) displays data associated with digital wallet 600 to suspect consumer 702 (e.g., confirming login to wallet, and/or payment card selection information). Suspect consumer 702 selects a particular payment card (the "subject payment card") to use with this transaction, and submits the transaction for processing.

At step 1030a, in the example embodiment, the transaction is sent to wallet provider 1002 who, at step 1035, transmits transaction information (e.g., payment information) and other information (e.g., digital wallet information 730) to a merchant plug-in (MPI) system 1004. In other embodiments, such as when a digital wallet is not used, the transaction is sent (e.g., step 1030b) directly to MPI 1004 along with at least transaction information.

MPI 1004 initiates an authentication process associated with the subject transaction. More specifically, in the example embodiment, MPI 1004 gathers various data associated with the transaction and initiates an authentication transaction for authenticating suspect consumer 702. In some embodiments, MPI 1004 is similar to transaction processing system 910 (shown in FIG. 9). In other embodiments, MPI 1004 is similar to RBD 750 (shown in FIGS. 7 and 8). In some embodiments, MPI 1004 is a part of network 28. In the example embodiment, MPI 1004 gathers data including one or more of device information 720, digital wallet information 730, and payment card information 740 (as shown and described in reference to FIGS. 7 and 8). Further, MPI 1004 also identifies one or more of device score 810, access method score 820, card verification score 840, session trust level 830, transaction risk level 850, baseline recommendation 860, and/or risk result 752 (all shown and described in reference to FIGS. 7 and 8). For example, in one embodiment, MPI 1004 computes risk result 752 similar to RBD 750.

Steps 1040, 1045, 1050, and 1055 represent an example authentication transaction 1042 under the 3DS protocol. In some embodiments, authentication transaction 1042 is similar to transaction authentication 906 (shown in FIG. 9). In the example embodiment, MPI 1004 provides fraud-related data during a verification process to the issuing bank associated with the subject payment card (e.g., issuer 30) and/or an access control server (ACS) 1006 associated with issuer 30. More specifically, MPI 1004 provides fraud-related data to ACS 1006 using extension messages in the 3DS protocol within, for example, an enrollment check (VeReq, or "verification request") message 1044. The fraud-related data incorporated into VeReq message 1044 is described in greater detail below.

In the example embodiment, as a part of 3DS enrollment check, MPI 1004, network 28, and ACS 1006 utilize a non-critical extension to a 3DS VeReq message 1044 to pass fraud-related information to issuer 30 and/or ACS 1006. At step 1040, MPI 1004 generates VeReq message 1044 to include fraud-related data in an extension, and transmits VeReq message 1044 to a directory server 1008 associated with network 28. Directory server 1008 identifies issuer 30 and ACS 1006 by a primary account number (PAN) of the subject payment card and transmits VeReq message 1004 to ACS 1006. Issuer 30 and/or ACS 1006 extracts the fraud-related data (e.g., the extensions) from VeReq message 1044 for consideration when determining how to respond (e.g., the status given in a VeRes response message (not shown)).

Issuer 30, or ACS 1006 on behalf of issuer 30, may use the fraud-related data for many uses such as, for example, implementing their own risk-based decisioning system similar to RBD 750, 920. ACS 1006 determines a result of the enrollment check and, at steps 1050 and 155, responds with that result to directory server 1008 and back to MPI 1004. Based on the given result, the payment card transaction may be, for example, failed (e.g., if the subject payment card is ineligible for 3DS step-up authentication) or authenticated (e.g., receiving an AUTHENTICATION_COMPLETE message indicates that the issuer has sufficient data to authenticate the suspect consumer without any further interaction with the cardholder) or as requiring a challenge (e.g., receiving a CHALLENGE_REQUIRED message indicates that the issuer ACS has determined that the suspect consumer has to be challenged before proceeding with the transaction). In the example embodiment, a VeRes message (not shown in FIG. 10) includes an extension including an <authenticationAction> section including one of AUTHENTICATION_COMPLETE or CHALLENGE_REQUIRED that serves as a determination whether or not to further authenticate the suspect consumer 702 (e.g., the step-up 924 conditional shown in FIG. 9).

In the example embodiment, the extension to VeReq message 1044 is an extended markup language (XML) section nested into (e.g., added into) a base VeReq message as defined by the 3DS protocol. The extension section is started with a "<Extension>" start-tag and ended with a "</Extension>" end-tag. For example, consider the following example:

TABLE 4

Example VeReq Message with Extensions

| Line# | Message Text |
|---|---|
| (01) | <ThreeDSecure><Message id="vDNoqT3xtC7ShMIot2Z0"> <VeReq><version>1.0.2</version> <pan>521729******3800</pan> <Merchant><acqBIN>123456</acqBIN> |

TABLE 4-continued

Example VeReq Message with Extensions

| Line# | Message Text |
|---|---|
| (05) | <merID>123456789012</merID><br><name>Acme Bank Credit Card</name><br><country>826</country><br><url>http://www.bankurl.com/</url><br></Merchant> |
| (10) | <Browser><deviceCategory>0</deviceCategory></Browser><br><Purchase><xid>1a2b3c4d5e6f7g8h9i0j=</xid><br><date>20140101 22:00:00</date><br><amount>&#163;1,067.78</amount><br><purchAmount>106778</purchAmount> |
| (15) | <currency>826</currency><br><exponent>2</exponent><br></Purchase><br><Extension id="TrustedThirdParty" critical="false"><br><version>1.0</version> |
| (20) | <RiskDetermination><br><transactionID>xxyyzz</transactionID><br><provider>01</provider><br><score min="0" max="1000">980</score><br></RiskDetermination> |
| (25) | <Wallet><br><provider>Wallet Provider Co.</provider><br><authenticationSessionID>aslkjslk4jlks889wuxxuo</authenticationSessionID><br><authenticationValidationSupport>false</authenticationValidationSupport><br><transactionRefNumber>wrozorkl2251skjo0oiu</transactionRefNumber> |
| (30) | <userProfileID>abcxyz</userProfileID><br><userAuthenticationStrength>Excellent</userAuthenticationStrength><br><userAccountAge>565</userAccountAge><br><userConfidenceScore min="" max=""></userConfidenceScore><br><paymentCardAge></paymentCardAge> |
| (35) | <paymentCardValidationMethod></paymentCardValidationMethod><br><deviceConfidencelevel></deviceConfidencelevel><br></Wallet><br></Extension><br></VeReq></Message></ThreeDSecure> |

The example VeReq message shown in Table 4 includes several fields that provide transaction data associated with the subject transaction, such as a primary account number at line (3), merchant information at lines (4) to (9) (e.g., a merchant ID, an acquirer BIN), and purchase information at lines (11) to (17) (e.g., a purchase amount and date). Further, the example VeReq message includes an extension section at lines (18) to (37). This extension section contains one or more elements of fraud-related information.

In the example embodiment, the extension section includes one or more sub-sections, or sections within the extension section. In the example shown in Table 4, the extension section includes two sub-sections: a <RiskDetermination> section from lines (20) to (24) (terminated by </RiskDetermination>) and a <Wallet> section from lines (25) to (37) (terminated by </Wallet>). Each of these sections embeds information associated with one or more aspects of risk scoring of the subject transaction. Each sub-section of the extension section is referred to herein by the extension sub-section's start-tag, for convenience. Further, it should be understood that the exact sub-section tag names used as examples herein are merely example tag names, and these tag name may vary within the scope of this disclosure.

In the example embodiment, the <RiskDetermination> section is directed to providing an overall risk score provided by a risk-based decisioning service such as RBD 750 or 920 (e.g., baseline recommendation 860 and/or risk result 752, both shown in FIG. 8). In the example shown in Table 4, <RiskDetermination> includes a <transactionID> (e.g., line (21)), a <provider> (e.g., line (22)), and a <score> (e.g., line (23)). <provider> is an identifier specifying the provider of the risk score (e.g., the party associated with RBD 750 or 920). <transactionID> is a unique ID for the subject transaction that may be used to identify this particular transaction at a later date. <score> is a value that represents the overall score assigned to this transaction (e.g., by <provider>). In this example, the <provider> has generated a score of "980" for this transaction (on a scale between "0" and "1,000"). In some embodiments, <RiskDetermination> may also include a <recommendation> sub-section. <recommendation> represents a recommended course of action based on <score>. In one embodiment, <recommendation> is an enumerated data type consisting of either "Good" or "Bad", which may be used by issuer 30 or ACS 1006 to determine whether or not to allow the transaction to process without further authentication (e.g., without 3DS step-up challenge 932 (shown in FIG. 9)).

In the example embodiment, the <Wallet> section is directed to providing information associated with a digital wallet (e.g., dital wallet information 730 for digital wallet 600, both shown in FIG. 7). In the example shown in Table 4, <Wallet> includes a <provider> section representing the provider of the digital wallet (e.g., "Wallet Provider Co.") and, in some embodiments, may include sub-sections for the provider's name and/or identifier. <Wallet> also includes a <authenticationSessionID> section representing a unique identifier (e.g., "aslkjslk4jlks889wuxxuo") associated with an authentication session of the subject transaction with the subject digital wallet. <Wallet> further includes a <authenticationValidationSupport> section indicating whether validation support is included in the digital wallet.

In the example embodiment, the <Wallet> section also includes a <transactionRefNumber> section representing a unique identifier (e.g., "wrozork12251skjo0oiu") associated with the transaction and the wallet. <Wallet> also includes a <userProfileID> section representing a unique identifier (e.g., "abcxyz") associated with the user account of the wallet. <Wallet> further includes a <userAuthenticationStrength> section representing an enumerated value indicating the login strength (e.g., "Excellent") associated with the suspect consumer's authentication or login to the subject digital wallet. In some embodiments, this enumerated list includes "fraud", "basic", "good", "excellent", and "trusted".

In the example embodiment, <Wallet> also includes a <userAccountAge> section representing a length of time (e.g., 565 days) the subject digital wallet has been active. <Wallet> further includes a <userConfidenceScore> representing a score or sub-score associated with how the suspect consumer authenticated with the subject digital wallet during this transaction and/or past transactions.

Further, in the example embodiment, <Wallet> also includes a <paymentCardAge> section representing a length of time the subject payment card has been associated with the subject digital wallet. <Wallet> also includes a <paymentCardValidationMethod> section. <Wallet> also includes a <deviceConfidencelevel> section representing a score or sub-score associated with the device accessing the subject wallet during the subject transaction (e.g., in some embodiments, device score 810).

In some embodiments, <Wallet> may also include a <score> section representing an overall transaction trust level score based on digital wallet information associated with the subject digital wallet as used in the subject transaction. For example, <score> may be an access method score 820 generated by RBD 750 using digital wallet information 730 as described and shown in relation to FIGS. 7 and 8. In some embodiments, <score> may be provided by the digital wallet provider. In some embodiments, this score may be provided in addition to, or in lieu of, <transactionTrustLevel>. Alternatively, this "wallet score" may be provided as a subsection of <RiskDetermination>. In other embodiments, other digital wallet information 730 may be included as sub-sections of <wallet>.

In some embodiments, the <RiskDetermination> section also includes a <deviceTrustLevel> section that represents a score associated with the subject device used during the subject transaction. In some embodiments, the <deviceTrustLevel> includes one of an enumerated list that includes "fraud", "basic", "good", "excellent", and "trusted". In some embodiments, the <deviceTrustLevel> is similar to device score 810 (shown in FIG. 8). In some embodiments, the <deviceTrustLevel> is determined based at least in part on device information 720 (shown in FIGS. 7 and 8).

Further, in some embodiments, the <RiskDetermination> section also includes a <sessionTrustLevel> section that represents a score associated with a trustworthiness of the login session associated with the subject payment card transaction. In some embodiments, <sessionTrustLevel> includes one of an enumerated list that includes "basic", "good", "excellent", and "trusted". In some embodiments, <sessionTrustLevel> is similar to session trust level 830 (shown in FIG. 8).

Figure 11:
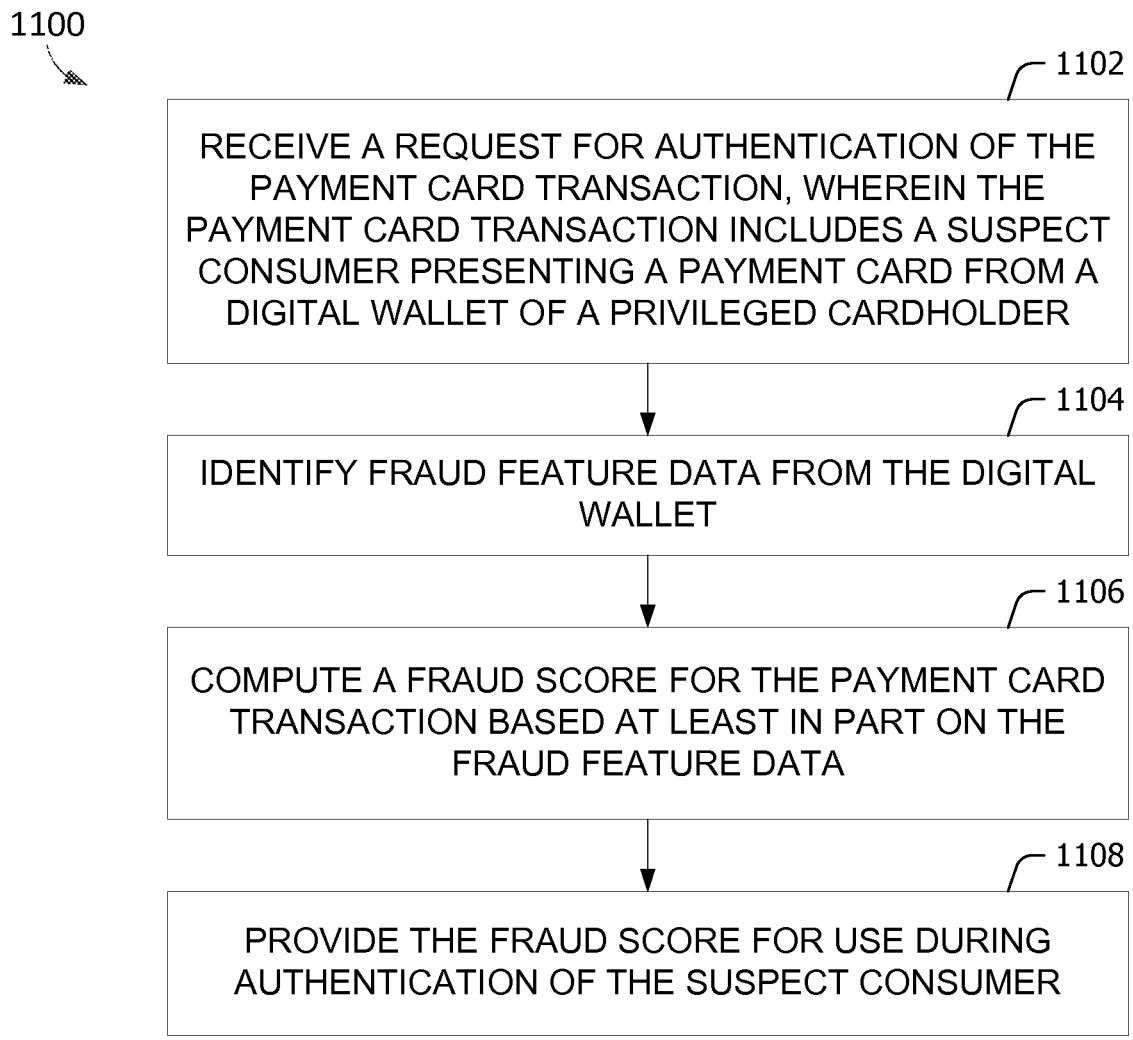

FIG. 11 is an example method 1000 for risk-based analysis of a payment card transaction using, for example, the risk-based decisioning (RBD) system 750, 910 shown in FIGS. 7-9 in the example environment 100 shown in FIG. 1. In the example embodiment, method 1000 is performed by a computing system such as server 112 (shown in FIG. 2), transaction processing system 122 (shown in FIGS. 3 and 6), RBD module 750 (shown in FIGS. 7 and 8), or RBD system 920 (shown in FIG. 9). In the example embodiment, method 1100 includes receiving 1102 a request for authentication of the payment card transaction. The payment card transaction includes a suspect consumer presenting a payment card from a digital wallet of a privileged cardholder. Method 1100 further includes identifying 1104 fraud feature data from the digital wallet. Method 1100 also includes computing 1106 a fraud score for the payment card transaction based at least in part on the fraud feature data. Method 1100 further includes providing 1108 the fraud score for use during authentication of the suspect consumer.

Figure 12:
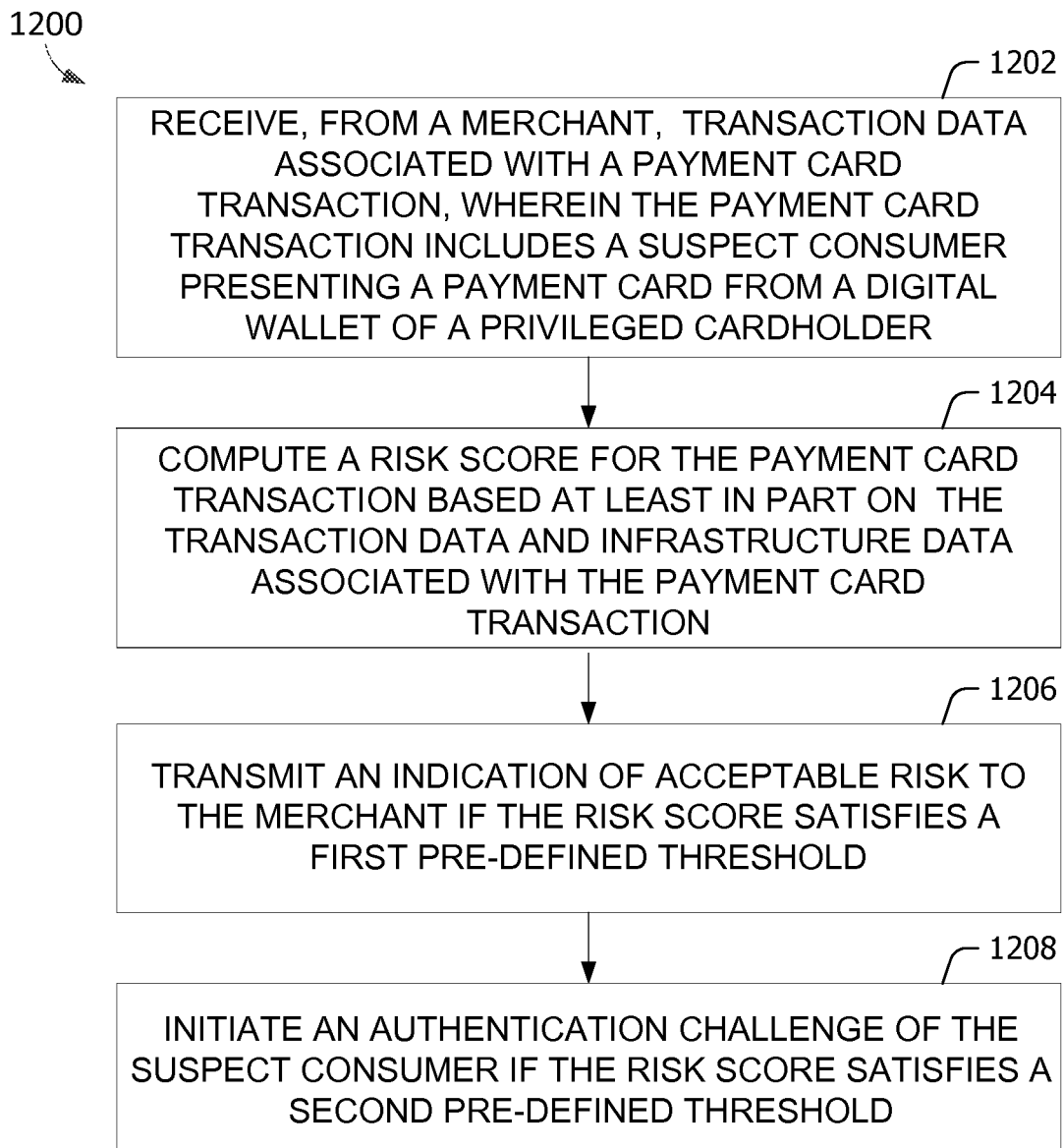

FIG. 12 is an example method 1200 for providing risk-based decisioning to a merchant during payment card transactions in the example environment 100 shown in FIG. 1. In the example embodiment, method 1200 is performed by a computing system such as server 112 (shown in FIG. 2), transaction processing system 122 (shown in FIGS. 3 and 6), RBD module 750 (shown in FIGS. 7 and 8), or RBD system 920 (shown in FIG. 9). In the example embodiment, method 1200 includes receiving 1202, from the merchant, transaction data associated with a payment card transaction. The payment card transaction includes a suspect consumer presenting a payment card from a digital wallet of a privileged cardholder. Method 1200 further includes computing 1204 a risk score for the payment card transaction based at least in part on the transaction data and infrastructure data associated with the payment card transaction. Method 1200 also includes transmitting 1206 an indication of acceptable risk to the merchant if the risk score satisfies a first pre-defined threshold. Thereby, the merchant may continue processing the payment card transaction without liability shifting away from the merchant. Method 1200 further includes initiating 1208 an authentication challenge of the suspect consumer if the risk score satisfies a second pre-defined threshold. Thereby, liability may shift away from the merchant.

Figure 13:
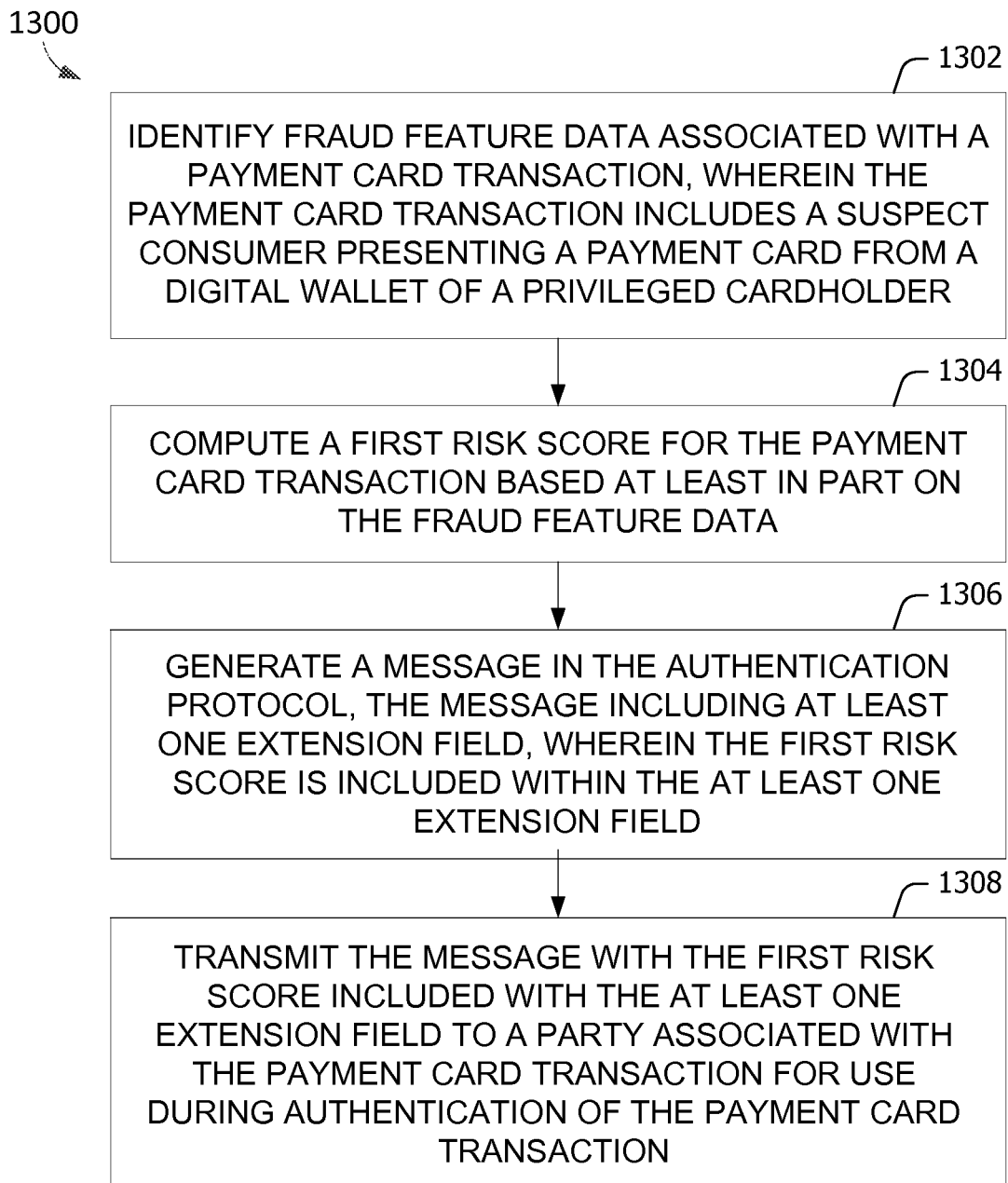

FIG. 13 is an example method 1300 for providing fraud data within an authentication system including an authentication protocol. In the example embodiment, method 1300 is performed by a computing system such as server 112 (shown in FIG. 2), transaction processing system 122 (shown in FIGS. 3 and 6), RBD module 750 (shown in FIGS. 7 and 8), or RBD system 920 (shown in FIG. 9). In the example embodiment, method 1300 includes identifying 1302 fraud feature data associated with a payment card transaction. The payment card transaction includes a suspect consumer presenting a payment card from a digital wallet of a privileged cardholder. Method 1300 also includes computing 1304 a first risk score for the payment card transaction based at least in part on the fraud feature data. Method 1300 further includes generating 1306 a message in the authentication protocol, the message including at least one extension field. The first risk score is included within the at least one extension field. Method 1300 also includes transmitting 1308 the message with the first risk score included within the at least one extension field to a party associated with the payment card transaction for use during authentication of the payment card transaction.

Figure 14:
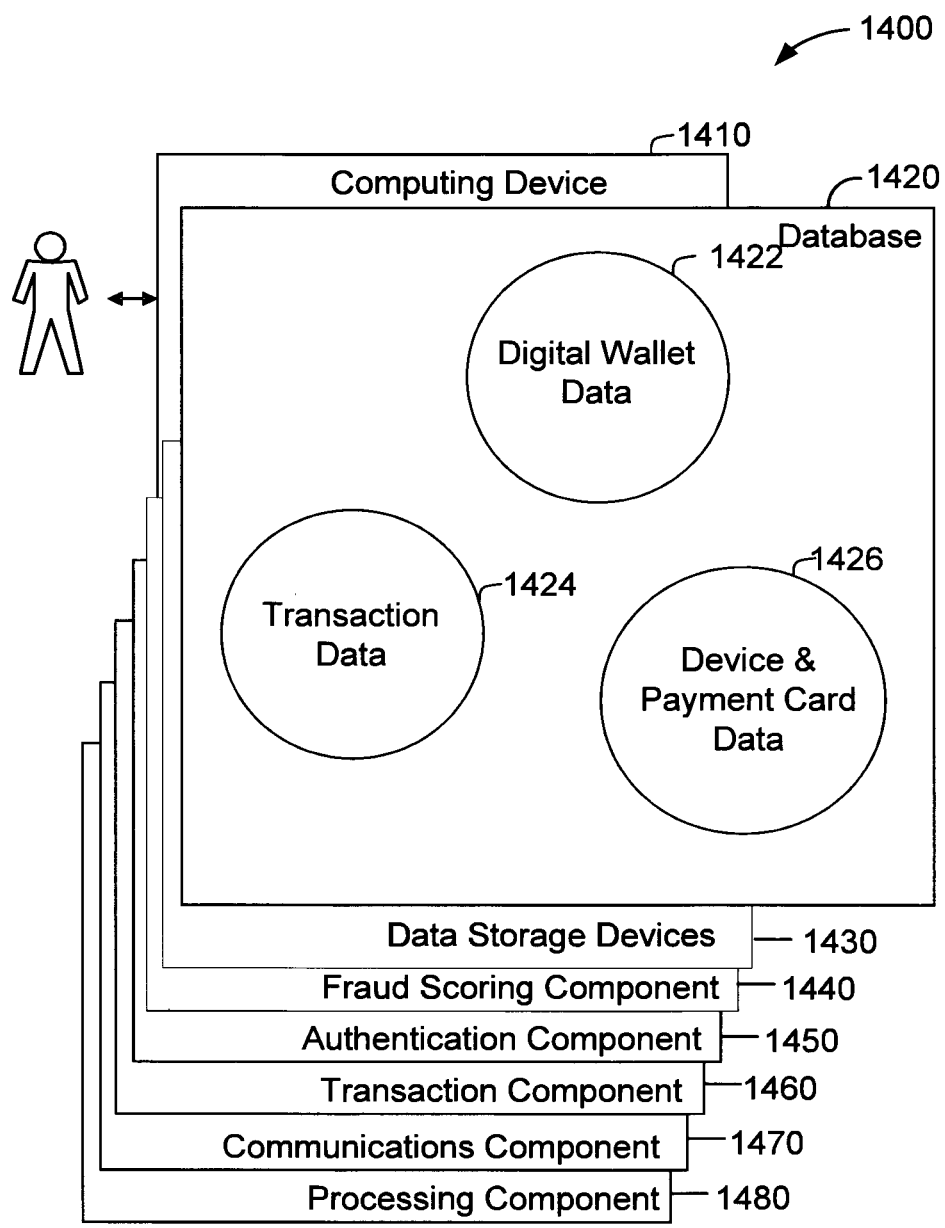

FIG. 14 shows an example configuration 1400 of a database 1420 within a computing device 1410, along with other related computing components, that may be used to analyze of a payment card transaction for risk, to provide risk-based decisioning to a merchant during payment card transactions, and/or to provide fraud data within an authentication system including an authentication protocol. In some embodiments, computing device 1410 is similar to server 112 (shown in FIG. 2), transaction processing system 122 (shown in FIGS. 3 and 6), RBD module 750 (shown in FIGS. 7 and 8), RBD system 920 (shown in FIG. 9), and/or server system 301 (shown in FIG. 5). Database 1420 is coupled to several separate components within computing device 1410, which perform specific tasks.

In the example embodiment, database 1420 includes digital wallet data 1422, transaction data 1424, and device and payment card data 1426. In some embodiments, database 1420 is similar to database 120 (shown in FIG. 2). Digital wallet data 1422 includes information associated with a cardholder's digital wallet, such as digital wallet 600 (shown in FIG. 6). Transaction data 1424 includes information associated with payment card transactions. Device and payment card data 1426 includes data associated with device(s) used to conduct payment card transactions and payment card data used in those transactions.

Computing device 1410 includes the database 1420, as well as data storage devices 1430. Computing device 1410 also includes a fraud scoring component 1440 for computing fraud scores (e.g., risk result 752). Computing device 1410 also includes an authentication component 1450 (e.g., authentication service 930, shown in FIG. 9) for performing aspects of cardholder authentication. A transaction component 1460 is also included for performing aspects of payment card transaction processing. A communications component 1470 is also included for communicating data between components associated with the payment card transaction process. A processing component 1480 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computing device for risk-based analysis of a payment card transaction, said computing device comprising a processor communicatively coupled to a memory, said computing device programmed to:

receive, during a current online card-not-present (CNP) financial transaction, an authentication request for authentication of the current online CNP financial transaction prior to submission of the current online CNP financial transaction for authorization, wherein the current online CNP financial transaction includes a suspect consumer providing payment card data stored in a digital wallet on a user computing device used to conduct the current online CNP financial transaction with a first merchant, and wherein the authentication request includes transaction data associated with the current online CNP financial transaction, digital wallet data associated with the digital wallet used to conduct the current online CNP financial transaction, and current device data associated with the user computing device, wherein the digital wallet data is captured at the user computing device during the current online CNP financial transaction;

parse the digital wallet data from the authentication request;

identify historical digital wallet use data for the digital wallet stored in the digital wallet, wherein the historical digital wallet use data is associated with use of the digital wallet to conduct one or more previous online financial transactions;

compute a digital wallet score for the current online CNP financial transaction based a comparison of the transaction data and the digital wallet data with the historical digital wallet use data;

compute a device score for the current online CNP financial transaction based on the current device data, the device score representing a likelihood that the user computing device is trustworthy;

receive a first scoring configuration profile from at least one of the first merchant and another party to the current online CNP financial transaction, the first scoring configuration profile defining at least one transaction amount range, each of the at least one transaction amount ranges associated with a corresponding risk level;

store the first scoring configuration profile in said memory;

determine a transaction amount of the current online CNP financial transaction;

perform a lookup in said memory of the first scoring configuration profile using the transaction amount to identify a risk level associated with the transaction amount;

compute a fraud score based on the digital wallet score, the device score, and the risk level associated with the transaction amount, the fraud score representing a likelihood that the suspect consumer is a user privileged to use the digital wallet;

generate an enriched authentication response message that includes an extension including the fraud score; and transmit the enriched authentication response message to the first merchant with the fraud score for use by the first merchant during authentication of the current online CNP financial transaction prior to submitting an authorization request message requesting authorization of the current online CNP financial transaction, wherein the enriched authentication response message including the extension with the fraud score is received at the first merchant such that the first merchant uses the fraud score to determine whether to submit the authorization request message requesting authorization of the current online CNP financial transaction.

2. The computing device of claim 1, wherein the digital wallet data includes a current authentication method associated with an access of the digital wallet to conduct the current online CNP financial transaction, and wherein the historical digital wallet use data includes historical authentication data associated with one or more prior access instances of a privileged cardholder authenticating into the digital wallet, wherein said computing device is further programmed to compute the fraud score based at least in part on comparing the current authentication method to the historical authentication data.

3. The computing device of claim 1, wherein the authentication request further includes current personal data provided during the current online CNP financial transaction, and wherein said computing device is further programmed to:
  identify verified personal data stored in the digital wallet; and
  compute the fraud score further based on comparing the current personal data with the verified personal data.

4. The computing device of claim 1, wherein the historical digital wallet use data from the digital wallet includes historical device data associated with past transactions involving the digital wallet, wherein said computing device is further programmed to compute the device score based on comparing the current device data to the historical device data.

5. The computing device of claim 1, wherein the authentication request further includes current loyalty account data provided during the current online CNP financial transaction, and wherein said computing device is further programmed to:
  identify verified loyalty account data stored in the digital wallet; and
  compute the fraud score based at least in part on comparing the current loyalty account data to the verified loyalty account data.

6. A computer-based method for risk-based analysis of a payment card transaction, the method implemented using a computer device including a processor and a memory, said method comprising:
  receiving, during a current online card-not-present (CNP) financial transaction, an authentication request for authentication of the current online CNP financial transaction prior to submission of the current online CNP financial transaction for authorization, wherein the current online CNP financial transaction includes a suspect consumer providing payment card data stored in a digital wallet on a user computing device used to conduct the current online CNP financial transaction with a first merchant, and wherein the authentication request includes transaction data associated with the current online CNP financial transaction, digital wallet data associated with the digital wallet used to conduct the current online CNP financial transaction, and current device data associated with the user computing device, wherein the digital wallet data is captured at the user computing device during the current online CNP financial transaction;
  parsing the digital wallet data from the authentication request;
  identifying historical digital wallet use data for the digital wallet stored in the digital wallet, wherein the historical digital wallet use data is associated with use of the digital wallet to conduct one or more previous online financial transactions;
  computing a digital wallet score for the current online CNP financial transaction based on a comparison of the transaction data and the digital wallet data with the historical digital wallet use data;
  computing a device score for the current online CNP financial transaction based on the current device data, the device score representing a likelihood that the user computing device is trustworthy;
  receiving a first scoring configuration profile from at least one of the first merchant and another party to the current online CNP financial transaction, the first scoring configuration profile defining at least one transaction amount range, each of the at least one transaction amount ranges associated with a corresponding risk level;
  storing the first scoring configuration profile in the memory;
  determining a transaction amount of the current online CNP financial transaction;
  performing a lookup in the memory of the first scoring configuration profile using the transaction amount to identify a risk level associated with the transaction amount;
  computing a fraud score based on the digital wallet score, the device score, and the risk level associated with the transaction amount, the fraud score representing a likelihood that the suspect consumer is a user privileged to use the digital wallet;
  generating an enriched authentication response message that includes an extension including the fraud score; and
  transmitting the enriched authentication response message to the first merchant with the fraud score for use by the first merchant during authentication of the current online CNP financial transaction prior to submitting an authorization request message requesting authorization of the current online CNP financial transaction, wherein the enriched authentication response message including the extension with the fraud score is received at the first merchant such that the first merchant uses the fraud score to determine whether to submit the authorization request message requesting authorization of the current online CNP financial transaction.

7. The method of claim 6, wherein the digital wallet data includes a current authentication method associated with an access of the digital wallet to conduct the current online CNP financial transaction, and wherein the historical digital wallet use data includes historical authentication data associated with one or more prior access instances of a privileged cardholder authenticating into the digital wallet, wherein computing the fraud score further includes comparing the current authentication method to the historical authentication data.

8. The method of claim 6, wherein the authentication request further includes current personal data provided during the current online CNP financial transaction, and wherein computing the fraud score further comprises:
identifying verified personal data stored in the digital wallet; and
comparing the current personal data with the verified personal data.

9. The method of claim 6, wherein the historical digital wallet use data from the digital wallet includes historical device data associated with past transactions involving the digital wallet, wherein computing the device score further comprises comparing the current device data to the historical device data.

10. The method of claim 6, wherein the authentication request further includes current loyalty account data provided during the current online CNP financial transaction, and wherein computing the fraud score further comprises:
identifying verified loyalty account data stored in the digital wallet; and
comparing the current loyalty account data to verified loyalty account data.

11. At least one non-transitory computer-readable storage media having computer-executable instructions embodied thereon, wherein when executed by at least one processor, the computer-executable instructions cause the processor to:
receive, during a current online card-not-present (CNP) financial transaction, an authentication request for authentication of the current online CNP financial transaction prior to submission of the current online CNP financial transaction for authorization, wherein the current online CNP financial transaction includes a suspect consumer providing payment card data stored in a digital wallet on a user computing device used to conduct the current online CNP financial transaction with a first merchant, and wherein the authentication request includes transaction data associated with the current online CNP financial transaction, digital wallet data associated with the digital wallet used to conduct the current online CNP financial transaction, and current device data associated with the user computing device, wherein the digital wallet data is captured at the user computing device during the current online CNP financial transaction;
parse the digital wallet data from the authentication request;
identify historical digital wallet use data for the digital wallet stored in the digital wallet, wherein the historical digital wallet use data is associated with use of the digital wallet to conduct one or more previous online financial transactions;
compute a digital wallet score for the current online CNP financial transaction based on a comparison of the transaction data and the digital wallet data with the historical digital wallet use data;
compute a device score for the current online CNP financial transaction based on the current device data, the device score representing a likelihood that the user computing device is trustworthy;
receive a first scoring configuration profile from at least one of the first merchant and another party to the current online CNP financial transaction, the first scoring configuration profile defining at least one transaction amount range, each of the at least one transaction amount ranges associated with a corresponding risk level;
store the first scoring configuration profile;
determine a transaction amount of the current online CNP financial transaction;
perform a lookup of the first scoring configuration profile using the transaction amount to identify a risk level associated with the transaction amount;
compute a fraud score based on the digital wallet score, the device score, and the risk level associated with the transaction amount, the fraud score representing a likelihood that the suspect consumer is a user privileged to use the digital wallet;
generate an enriched authentication response message that includes an extension including the fraud score; and
transmit the enriched authentication response message to the first merchant with the fraud score for use by the first merchant during authentication of the current online CNP financial transaction prior to submitting an authorization request message requesting authorization of the current online CNP financial transaction, wherein the enriched authentication response message including the extension with the fraud score is received at the first merchant such that the first merchant uses the fraud score to determine whether to submit the authorization request message requesting authorization of the current online CNP financial transaction.

12. The computer-readable storage media of claim 11, wherein the digital wallet data includes a current authentication method associated with an access of the digital wallet to conduct the current online CNP financial transaction, and wherein the historical digital wallet use data includes historical authentication data associated with one or more prior access instances of a privileged cardholder authenticating into the digital wallet, wherein the computer-executable instructions further cause the processor to compute the fraud score based at least in part on comparing the current authentication method to the historical authentication data.

13. The computer-readable storage media of claim 11, wherein the fraud feature data includes current personal data provided during the current online CNP financial transaction, and wherein the computer-executable instructions further cause the processor to:
identify verified personal data stored in the digital wallet; and
compute the fraud score based at least in part on comparing the current personal data with the verified personal data.

14. The computer-readable storage media of claim 11, wherein the historical digital wallet use data from the digital wallet includes historical device data associated with past transactions involving the digital wallet, wherein the computer-executable instructions further cause the processor to compute the device score further based on comparing the current device data to the historical device data.

15. The computer-readable storage media of claim 11, wherein the digital wallet data includes current loyalty account data provided during the current online CNP financial transaction, and wherein the computer-executable instructions further cause the processor to:
  identify verified loyalty account data stored in the digital wallet; and
  compute the fraud score further based on comparing the current loyalty account data to verified loyalty account data.

* * * * *

UNITED STATES PATENT AND TRADEMARK OFFICE
CERTIFICATE OF CORRECTION

PATENT NO. : 10,657,521 B2
APPLICATION NO. : 14/719645
DATED : May 19, 2020
INVENTOR(S) : Tomasofsky et al.

Page 1 of 1

It is certified that error appears in the above-identified patent and that said Letters Patent is hereby corrected as shown below:

On the Title Page

Item (72), Lines 3-4, delete "Felipe de Almeida" and insert -- Filipe -- therefor.

Signed and Sealed this
Eleventh Day of August, 2020

Andrei Iancu
*Director of the United States Patent and Trademark Office*